US007893974B2

(12) United States Patent
Chiba

(10) Patent No.: US 7,893,974 B2
(45) Date of Patent: Feb. 22, 2011

(54) APPARATUS, METHOD, AND COMPUTER PROGRAM FOR PROCESSING INFORMATION

(75) Inventor: Takuya Chiba, Tokyo (JP)

(73) Assignee: Sony Corporation, Tokyo (JP)

( * ) Notice: Subject to any disclaimer, the term of this patent is extended or adjusted under 35 U.S.C. 154(b) by 1016 days.

(21) Appl. No.: 11/553,221

(22) Filed: Oct. 26, 2006

(65) Prior Publication Data
US 2007/0103744 A1 May 10, 2007

(30) Foreign Application Priority Data
Nov. 9, 2005 (JP) ............................. 2005-325079

(51) Int. Cl.
*H04N 5/208* (2006.01)
(52) U.S. Cl. ................. 348/252; 348/234; 348/235; 348/228.1; 348/229.1; 348/362
(58) Field of Classification Search ................. 348/234, 348/235, 228.1, 229.1, 362, 241, 243, 252, 348/255, 625, 627; 250/208.1; 257/257, 257/278, 294
See application file for complete search history.

(56) References Cited
U.S. PATENT DOCUMENTS
6,334,098 B1 * 12/2001 Shefer ........................ 702/189

| 7,418,132 | B2 * | 8/2008 | Hoshuyama | ................ 382/167 |
| 7,583,301 | B2 * | 9/2009 | Sakurai et al. | ............... 348/241 |
| 2005/0024508 | A1 * | 2/2005 | Okisu et al. | ................ 348/254 |
| 2006/0038899 | A1 * | 2/2006 | Tamaru et al. | ............... 348/241 |

FOREIGN PATENT DOCUMENTS
| JP | 2003-60983 | 2/2003 |
| JP | 2003-248827 | 9/2003 |
| JP | 2003-255424 | 9/2003 |

* cited by examiner

*Primary Examiner*—Yogesh K Aggarwal
(74) *Attorney, Agent, or Firm*—Oblon, Spivak, McClelland, Maier & Neustadt, L.L.P.

(57) ABSTRACT

An information processing apparatus for correcting chromatic aberration of video data, includes a white saturation pixel detecting unit for detecting a white saturation pixel having white saturation using a G signal of the video data composed of an RGB signal, a spatial signal processing unit for performing a spatial signal process on the RGB signal across a plurality of lines, a color signal generating unit for generating a color signal from the RGB signal processed by the spatial signal processing unit, a white saturation distribution information generating unit for generating white saturation distribution information representing a distribution of the white saturation pixels detected by the white saturation pixel detecting unit, and a chromatic aberration correcting unit for correcting a chromatic aberration of the color signal generated by the color signal generating unit, using the white saturation distribution information generated by the white saturation distribution information generating unit.

11 Claims, 29 Drawing Sheets

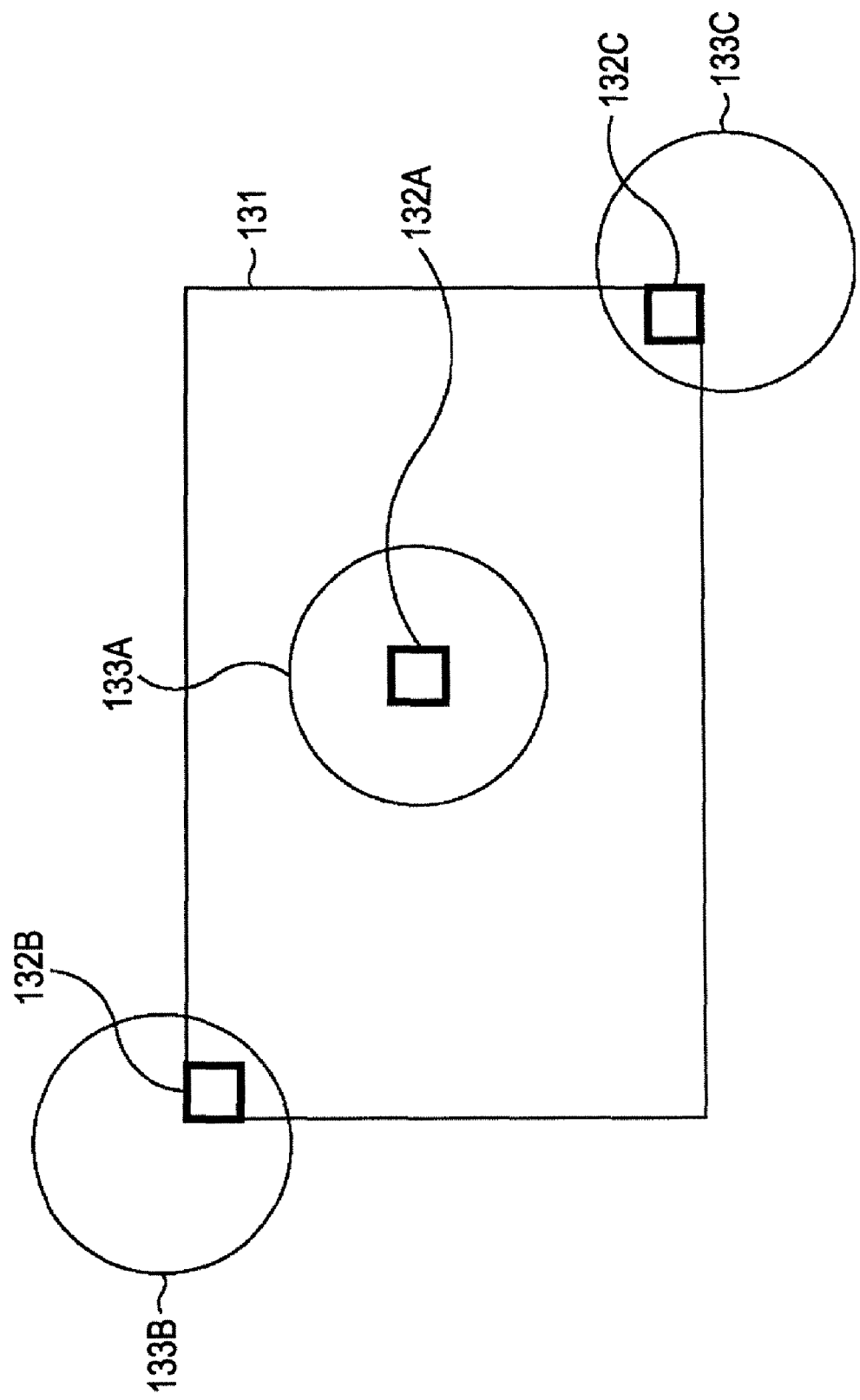

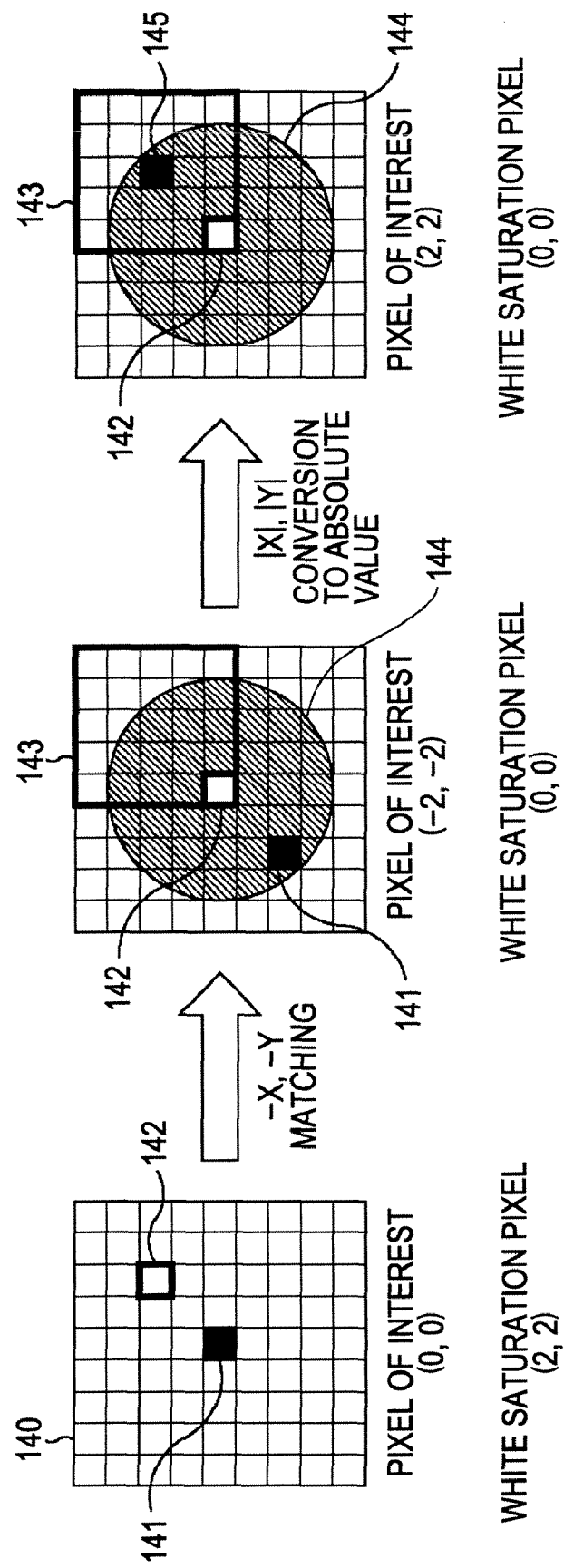

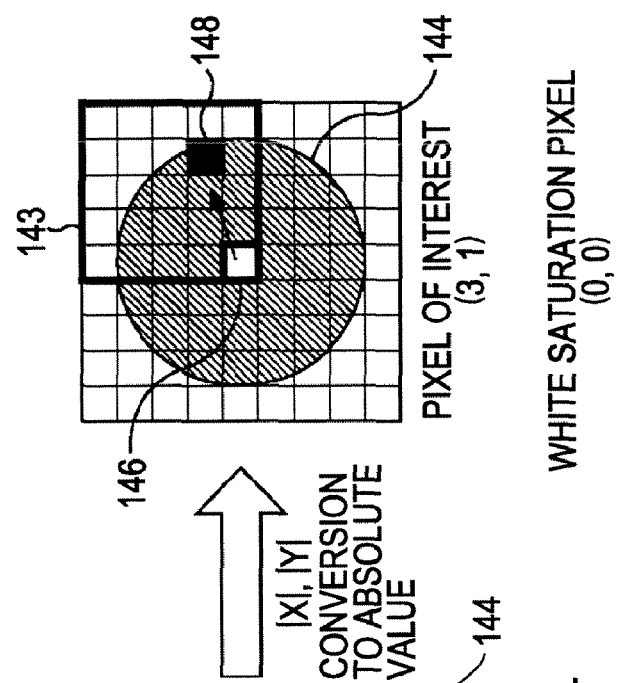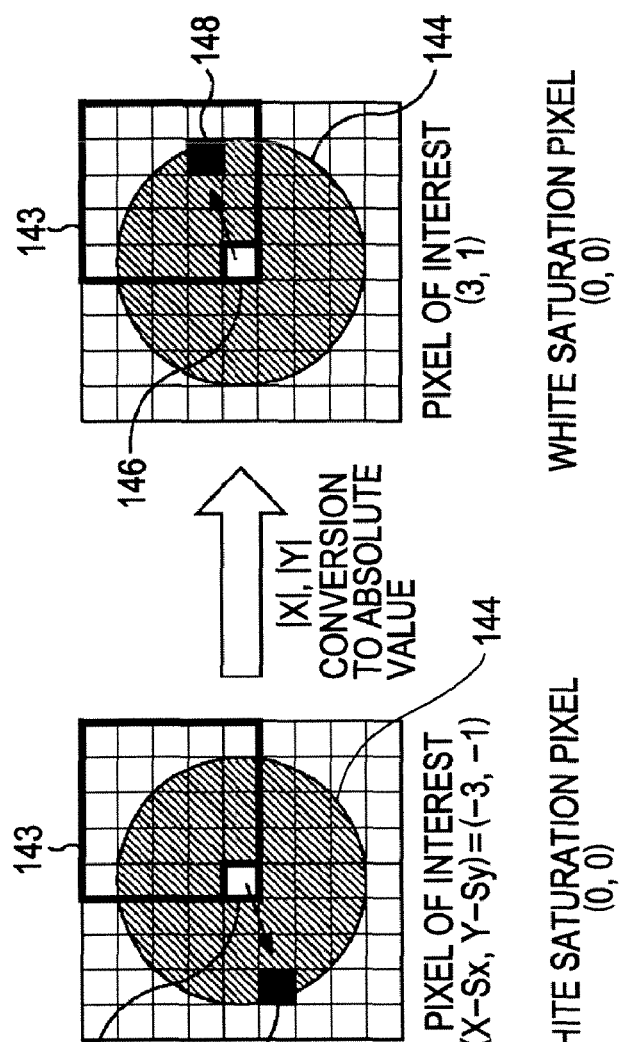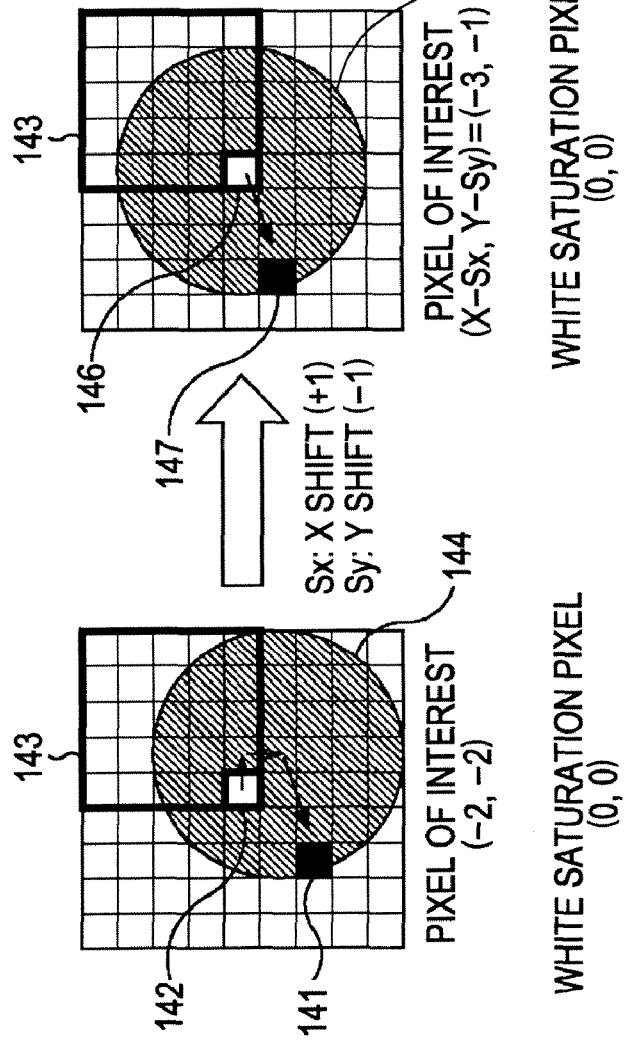

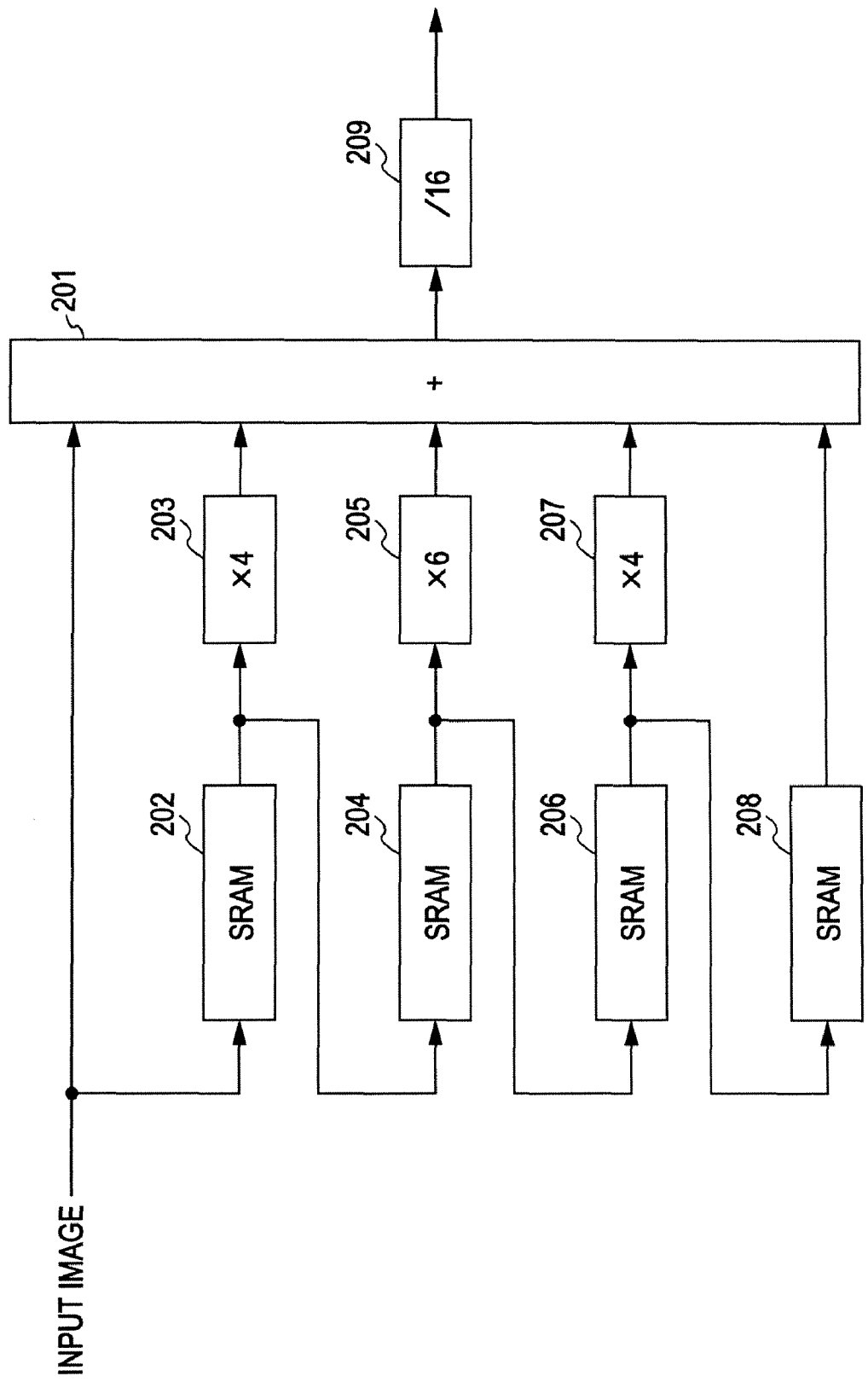

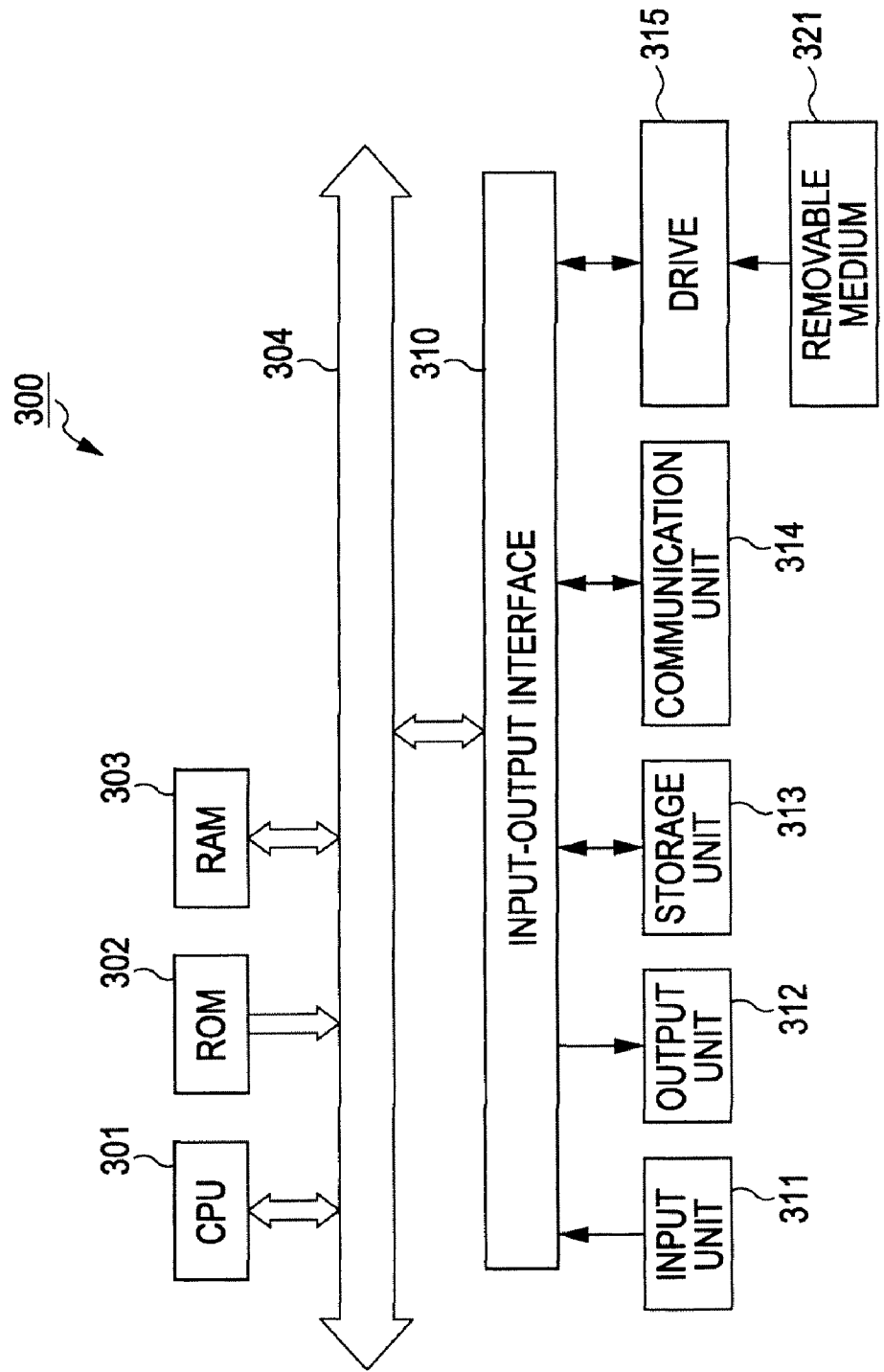

APPARATUS, METHOD, AND COMPUTER PROGRAM FOR PROCESSING INFORMATION

CROSS REFERENCES TO RELATED APPLICATIONS

The present invention contains subject matter related to Japanese Patent Application JP 2005-325079 filed in the Japanese Patent Office on Nov. 9, 2005, the entire contents of which are incorporated herein by reference.

BACKGROUND OF THE INVENTION

1. Field of the Invention

The present invention relates to an apparatus, method, and computer program of processing information and, in particular, to an apparatus, method and computer program appropriate for use in a correction process of chromatic aberration.

2. Description of the Related Art

Currently, there is a demand for electronic cameras that feature compact design and provide high magnification, a high number of pixels, and high image quality. However, it is very difficult to manufacture a lens having modulation transfer function characteristics meeting compact, high magnification, high pixel count design. A compact lens is typically subject to a variety of problems such as "aberration" that shifts focal point due to a position within a screen and wavelength, "shading" that attenuates an amount of incident light as it goes away from the center to the edge of the screen, and "distortion" that is caused with the position within the screen.

Japanese Unexamined Patent Application Publication No. 2003-255424 discloses a technique that corrects aberrations using a signal processing method, in particular, chromatic aberration. The aberration is one of problems characteristic of the lens.

In accordance with the disclosure, the center position of the optical axis of a photographing lens is determined for each of a red (R) image, a green (G) image, and a blue (B) image, and a resolution conversion is performed on the center position in accordance with conversion rate data for expansion and reduction.

SUMMARY OF THE INVENTION

The chromatic aberrations include not only "chromatic aberration of magnification" that changes image magnification due to color but also "axial chromatic aberration." The above-mentioned method may not make a correction on the "axial chromatic aberration."

It is thus desirable to make appropriate corrections on the two chromatic aberrations, namely, the chromatic aberration of magnification and the axial chromatic aberration in an integral manner rather than in an individual manner.

In accordance with one embodiment of the present invention, an information processing apparatus for correcting chromatic aberration of video data, includes a white saturation pixel detecting unit for detecting a white saturation pixel having white saturation using a G signal of the video data composed of an RGB signal, a spatial signal processing unit for performing a spatial signal process on the RGB signal across a plurality of lines, a color signal generating unit for generating a color signal from the RGB signal processed by the spatial signal processing unit, a white saturation distribution information generating unit for generating white saturation distribution information representing a distribution of the white saturation pixels detected by the white saturation pixel detecting unit, and a chromatic aberration correcting unit for correcting a chromatic aberration of the color signal generated by the color signal generating unit, using the white saturation distribution information generated by the white saturation distribution information generating unit.

The white saturation pixel detecting unit may include a white saturation pixel threshold value determining unit for determining according to a predetermined pixel threshold value whether a pixel of interest is a white saturation pixel, and a white saturation pixel determining unit for determining whether another white saturation pixel is present adjacent to the pixel of interest that is determined as a white saturation pixel by the white saturation pixel threshold value determining unit, wherein the pixel of interest is determined as a white saturation pixel only when the white saturation pixel determining unit determines that another white saturation pixel is present adjacent to the pixel of interest.

The white saturation distribution information may indicate the distribution of the white saturation pixels within a predetermined range surrounding the pixel of interest, and the white saturation distribution information generating unit may generate the white saturation distribution information for each of the pixels of the video data.

The chromatic aberration correcting unit may include a chromatic aberration level calculating unit for calculating a chromatic aberration level of each pixel, based on the white saturation distribution information of each pixel, generated by the white saturation distribution information generating unit, and chromatic aberration level distribution information indicating a distribution of chromatic aberration level as a correction amount to chromatic aberration of a surrounding pixel due to the white saturation of the pixel of interest, and a corrected signal generating unit for generating a corrected signal having the chromatic aberration of each pixel of the video data, the chromatic aberration corrected using the chromatic aberration level calculated by the chromatic aberration level calculating unit.

The chromatic aberration level calculating unit may include a comparing unit for comparing the chromatic aberration level distribution information with the white saturation distribution information in each pixel of the video data, wherein the chromatic aberration level of each pixel is calculated based on the comparison result of the comparing unit.

The comparing unit may calculate the chromatic aberration level of each pixel by determining and then integrating the chromatic aberration level of the pixel of interest caused by each white saturation pixel contained in the white saturation distribution information using the chromatic aberration level distribution information of each pixel of the video data.

The chromatic aberration level calculating unit may include a chromatic aberration of magnification correcting unit for correcting a distribution of the chromatic aberration level distribution information so that a chromatic aberration of magnification is corrected according to a position of the pixel of interest to be corrected in chromatic aberration within a screen.

The chromatic aberration correcting unit may further include a chrominance level calculating unit for calculating a chrominance level of each pixel based on the color signal of the video data, wherein the corrected signal generating unit multiplies the chromatic aberration level, calculated by the chromatic aberration level calculating unit, by the chrominance level calculated by the chrominance level calculating unit, and corrects the chromatic aberration of the video data using the multiplication result to generate the corrected signal.

The chromatic aberration correcting unit may include a mixing unit for mixing the corrected signal generated by the corrected signal generating unit and the uncorrected color signal of the video data in accordance with a ratio based on the multiplication result calculated by the corrected signal generating unit.

In accordance with one embodiment of the present invention, an image processing method of an image processing apparatus for correcting chromatic aberration of video data, includes steps of detecting a white saturation pixel having white saturation using a G signal of the video data composed of an RGB signal, performing a spatial signal process on the RGB signal across a plurality of lines, generating a color signal from the signal processed RGB signal, generating white saturation distribution information representing a distribution of the white saturation pixels, and correcting a chromatic aberration of the color signal, using the white saturation distribution information.

In accordance with one embodiment of the present invention, a computer program for causing a computer to correct chromatic aberration of video data, includes steps of detecting a white saturation pixel having white saturation using a G signal of the video data composed of an RGB signal, performing a spatial signal process on the RGB signal across a plurality of lines, generating a color signal from the signal processed RGB signal, generating white saturation distribution information representing a distribution of the white saturation pixels, and correcting a chromatic aberration of the color signal, using the white saturation distribution information.

In accordance with embodiments of the present invention, the white saturated pixel is detected using the G signal of the RGB signal, the spatial signal process is performed on the RGB signal across the plurality of lines, the color signal is generated from the signal processed RGB signal, and the white saturation distribution information indicating the distribution of the white saturated pixels is generated. Using the white saturation distribution information, the chromatic aberration is corrected.

In accordance with embodiments of the present invention, images are processed with chromatic aberration correction performed more easily and more accurately.

BRIEF DESCRIPTION OF THE DRAWINGS

FIG. 14 illustrates an example of chromatic aberration of magnification;

FIGS. 15A-15C illustrate a matching method when no chromatic aberration of magnification takes place;

FIGS. 16A-16C illustrate a matching method when a chromatic aberration of magnification takes place;

FIG. 22 illustrates a size of a memory used for the image processor shown in FIG. 1;

FIG. 30 illustrates a configuration of a personal computer in accordance with one embodiment of the present invention.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 23:
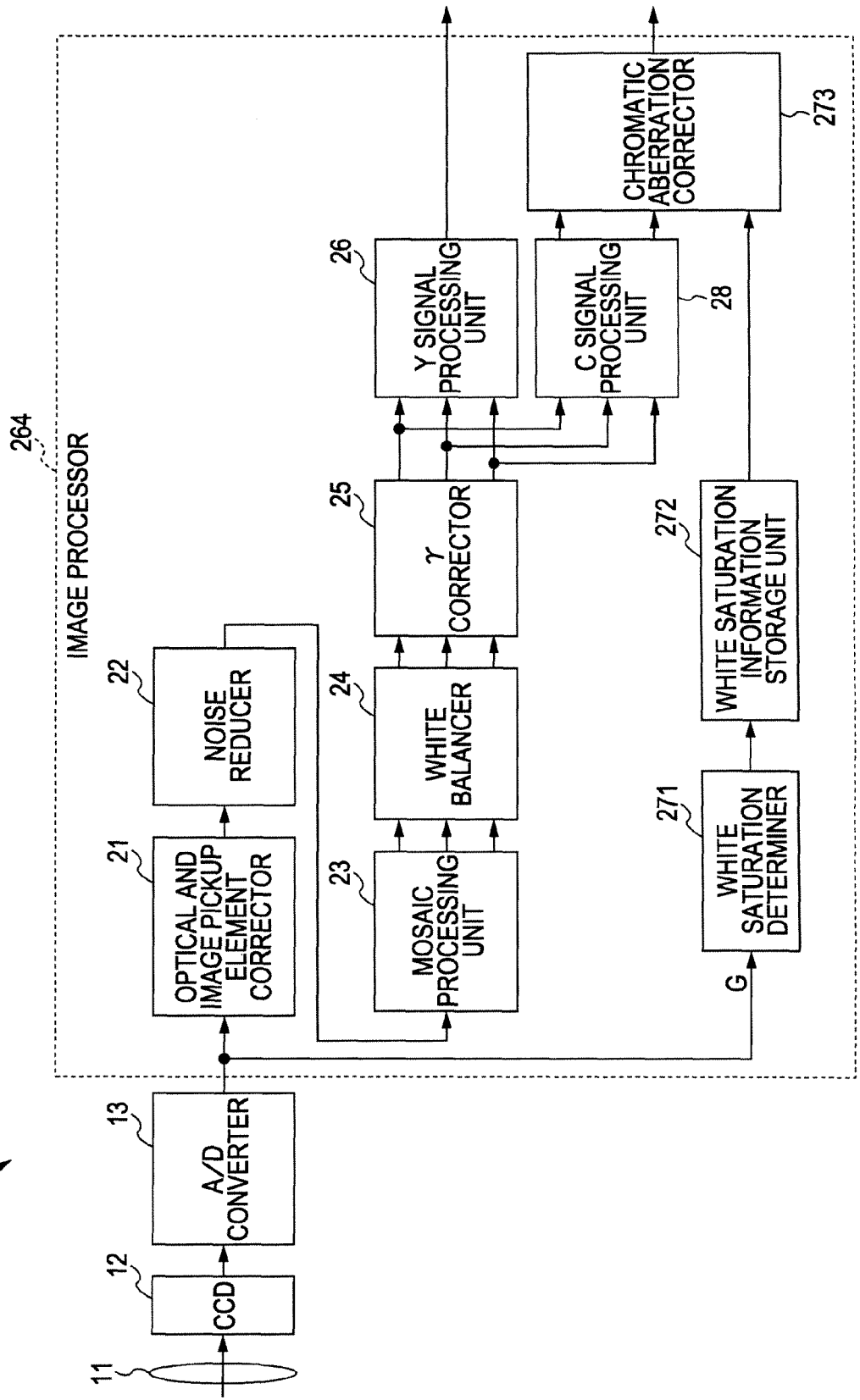
FIG. 23 is a block diagram illustrating a configuration of an image pickup apparatus in accordance with one embodiment of the present invention.

In accordance with one embodiment of the present invention, an information processing apparatus (for example, image processor 264 of FIG. 23) for correcting chromatic aberration of video data, includes a white saturation pixel detecting unit (for example, white saturation determiner 271 of FIG. 23) for detecting a white saturation pixel having white saturation using a G signal of the video data composed of an RGB signal, a spatial signal processing unit (for example, noise reducer 22 and mosaic processing unit 23 of FIG. 23) for performing a spatial signal process on the RGB signal across a plurality of lines, a color signal generating unit (for example, C signal processing unit 28 of FIG. 23) for generating a color signal from the RGB signal processed by the spatial signal processing unit, a white saturation distribution information generating unit (for example, white saturation information storage unit 272 of FIG. 23) for generating white saturation distribution information representing a distribution of the white saturation pixels detected by the white saturation pixel detecting unit, and a chromatic aberration correcting unit (for example, chromatic aberration corrector 273 of FIG. 23) for correcting a chromatic aberration of the color signal generated by the color signal generating unit, using the white saturation distribution information generated by the white saturation distribution information generating unit.

Figure 3:
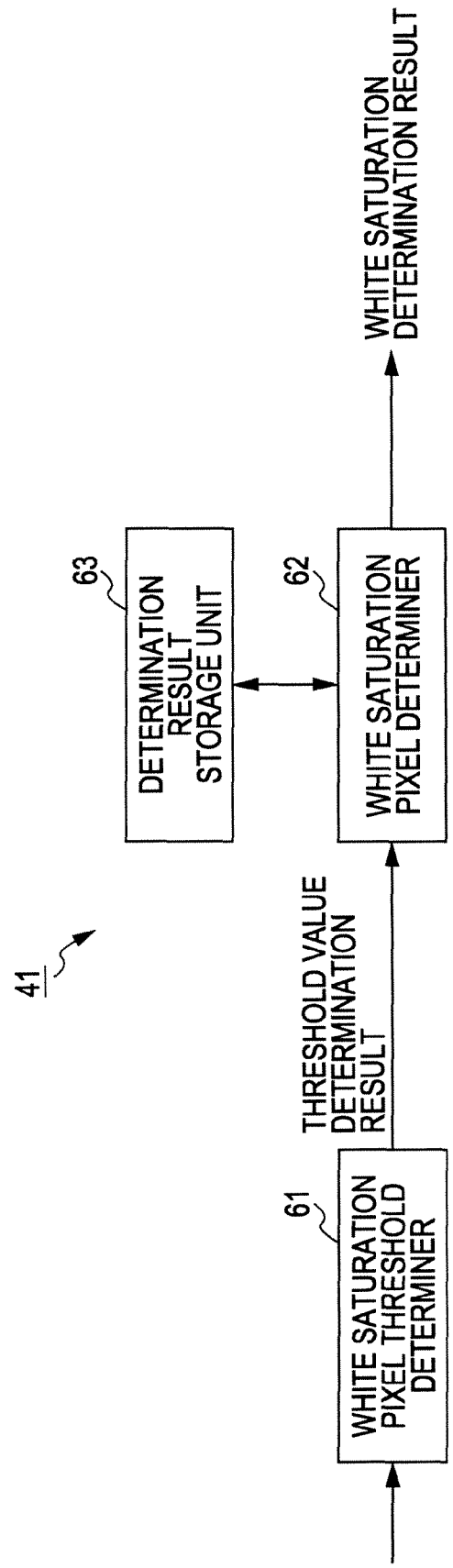
FIG. 3 is a block diagram illustrating in detail a white saturation determiner of FIG. 2.
Figure 11:
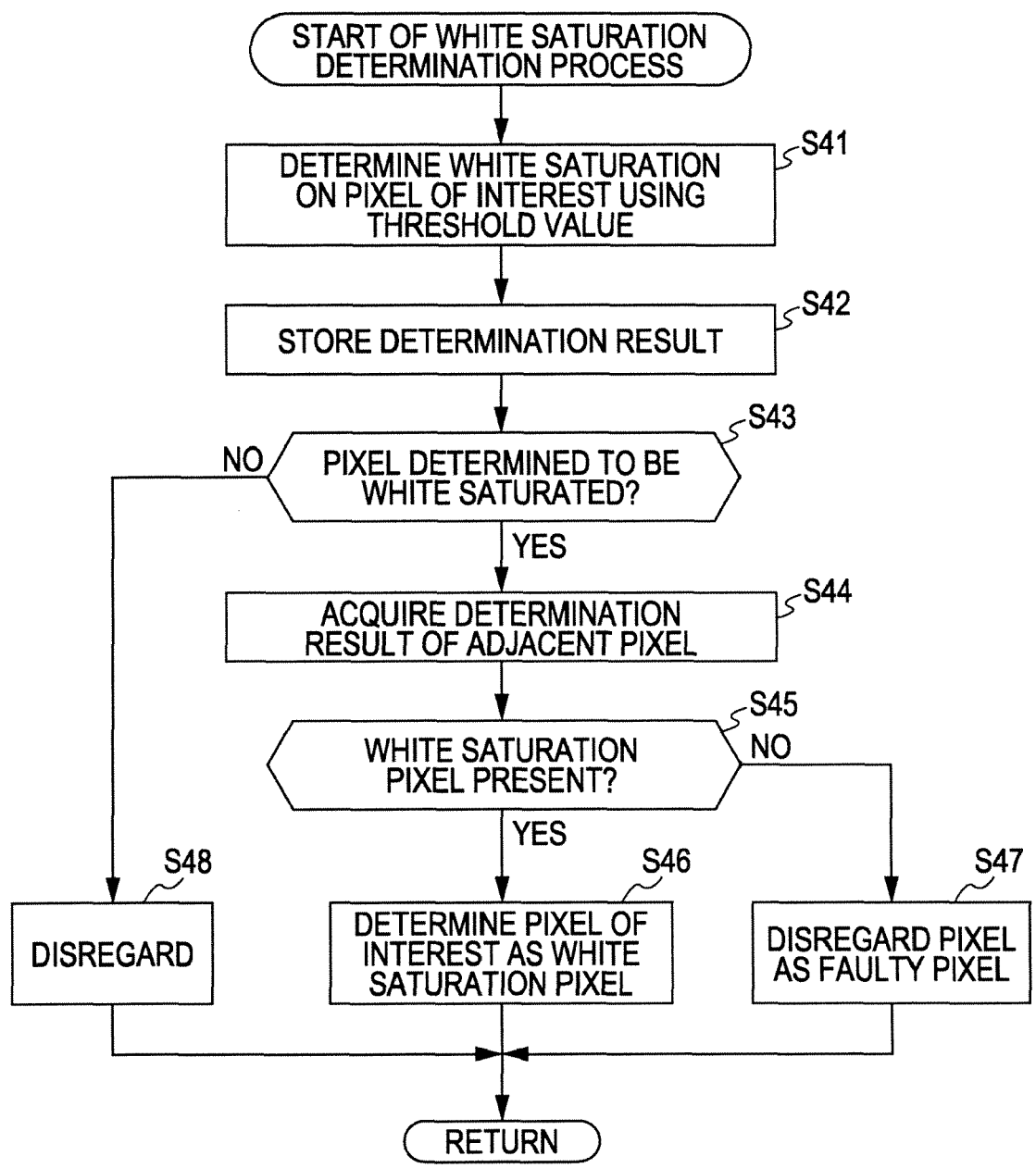
FIG. 11 is a flowchart illustrating in detail a white saturation determination process.

The white saturation pixel detecting unit may include a white saturation pixel threshold value determining unit (for example, white saturation pixel threshold determiner 61 of FIG. 3) for determining according to a predetermined pixel threshold value whether a pixel of interest is a white saturation pixel, and a white saturation pixel determining unit (for example, white saturation pixel determiner 62 of FIG. 3) for determining whether another white saturation pixel is present adjacent to the pixel of interest that is determined as a white saturation pixel by the white saturation pixel threshold value determining unit, wherein the pixel of interest is determined as a white saturation pixel (for example, in step S46 of FIG. 11) only when the white saturation pixel determining unit determines that another white saturation pixel is present adjacent to the pixel of interest.

Figure 9:
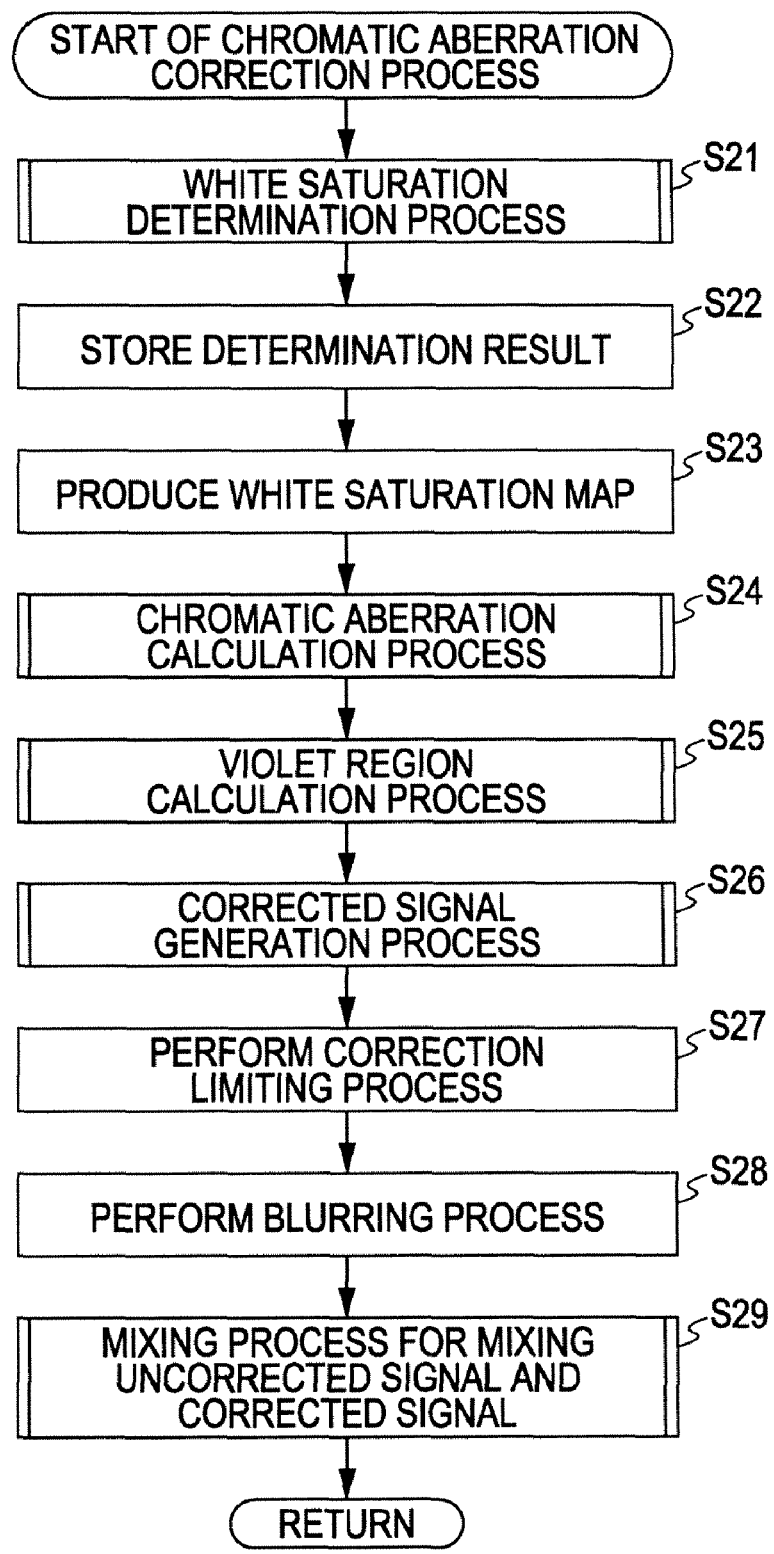
FIG. 9 is a flowchart illustrating in detail a chromatic aberration level correction process.

The white saturation distribution information (for example, white saturation map of FIG. 10) may indicate the distribution of the white saturation pixels within a predetermined range surrounding the pixel of interest, and the white saturation distribution information generating unit may generate the white saturation distribution information for each of the pixels of the video data (for example, in step S23 of FIG. 9).

The chromatic aberration correcting unit may include a chromatic aberration level calculating unit (for example, chromatic aberration level calculator 43 of FIG. 24) for calculating a chromatic aberration level of each pixel, based on the white saturation distribution information of each pixel, generated by the white saturation distribution information generating unit, and chromatic aberration level distribution information (for example, white saturation map of FIG. 13) indicating a distribution of chromatic aberration level as a correction amount to chromatic aberration of a surrounding pixel due to the white saturation of the pixel of interest, and a corrected signal generating unit (for example, corrected signal generator 46 of FIG. 24) for generating a corrected signal having the chromatic aberration of each pixel of the video data, the chromatic aberration corrected using the chromatic aberration level calculated by the chromatic aberration level calculating unit.

Figure 12:
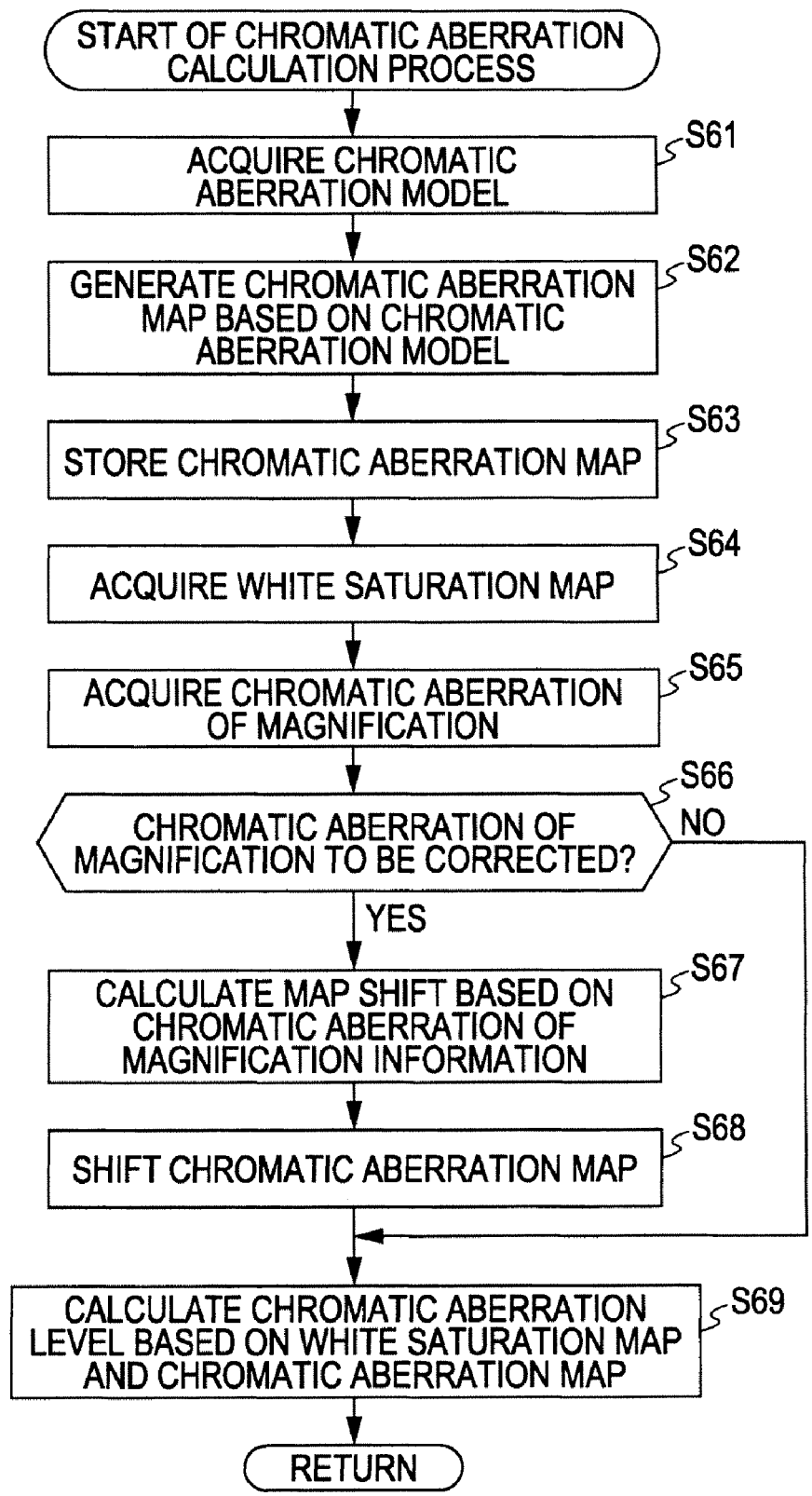
FIG. 12 is a flowchart illustrating in detail a chromatic aberration level calculation process.

The chromatic aberration level calculating unit may include a comparing unit (for example, map comparator 76 of FIG. 4) for comparing the chromatic aberration level distribution information with the white saturation distribution information in each pixel of the video data, wherein the chromatic aberration level of each pixel is calculated based on the comparison result of the comparing unit (for example, in step S69 of FIG. 12).

The comparing unit may calculate the chromatic aberration level of each pixel by determining and then integrating the chromatic aberration level of the pixel of interest caused by each white saturation pixel contained in the white saturation distribution information using the chromatic aberration level distribution information of each pixel of the video data (for example, in step S69 of FIG. 12).

Figure 4:
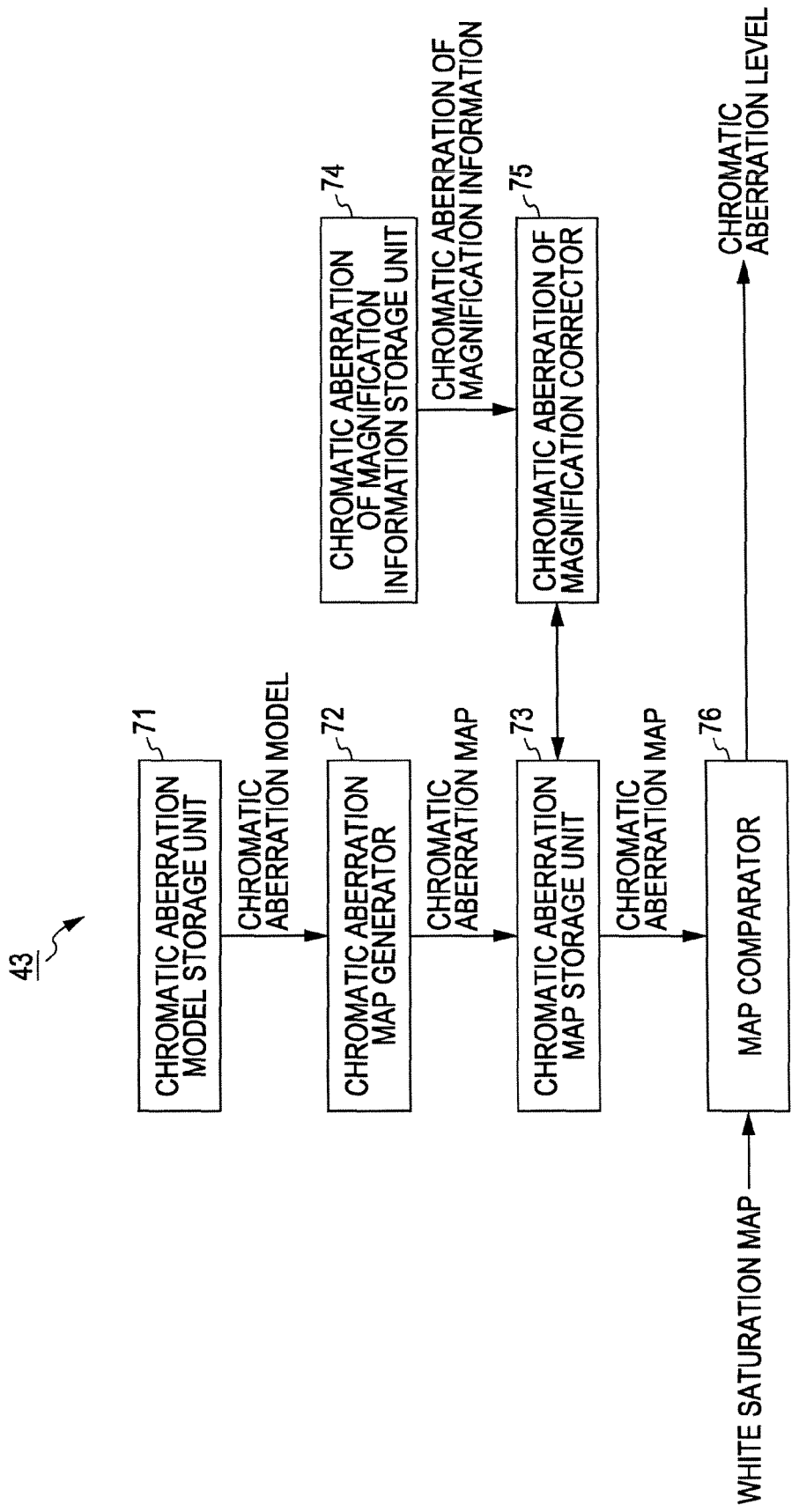
FIG. 4 is a block diagram of a chromatic aberration level calculator of FIG. 2.

The chromatic aberration level calculating unit may include a chromatic aberration of magnification correcting unit (for example, chromatic aberration of magnification corrector 75 of FIG. 4) for correcting a distribution of the chromatic aberration level distribution information so that a chromatic aberration of magnification is corrected according to a position of the pixel of interest to be corrected in chromatic aberration within a screen.

The chromatic aberration correcting unit may further includes a chrominance level calculating unit (for example, violet region calculator 45 of FIG. 24) for calculating a chrominance level of each pixel based on the color signal of the video data, wherein the corrected signal generating unit multiplies the chromatic aberration level, calculated by the chromatic aberration level calculating unit, by the chrominance level calculated by the chrominance level calculating unit, and corrects the chromatic aberration of the video data using the multiplication result to generate the corrected signal.

The chromatic aberration correcting unit may include a mixing unit (for example, mixer 49 of FIG. 24) for mixing the corrected signal generated by the corrected signal generating unit and the uncorrected color signal of the video data in accordance with a ratio based on the multiplication result calculated by the corrected signal generating unit.

Figure 25:
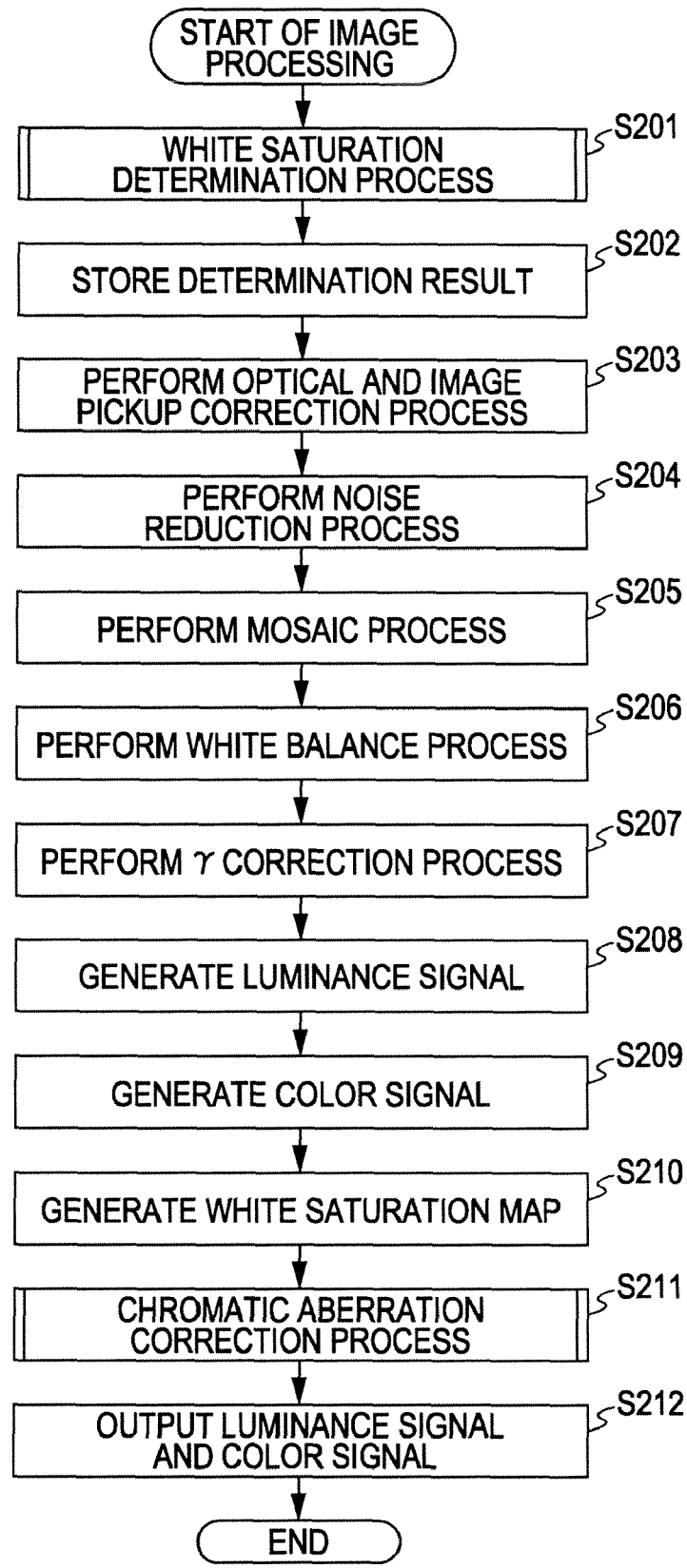
FIG. 25 is a flowchart illustrating a flow of image processing.

In accordance with one embodiment of the present invention, one of an image processing method and a computer program of an image processing apparatus (for example, image processor 264 of FIG. 23) for correcting chromatic aberration of video data, includes steps of detecting a white saturation pixel having white saturation using a G signal of the video data composed of an RGB signal (for example, in step S201 of FIG. 25), performing a spatial signal process on the RGB signal across a plurality of lines (for example, in steps S204 and S205 of FIG. 25), generating a color signal from the signal processed RGB signal (for example, in step S209 of FIG. 25), generating white saturation distribution information representing a distribution of the white saturation pixels (for example, step S210 of FIG. 25), and correcting a chromatic aberration of the color signal, using the white saturation distribution information (for example, step S211 of FIG. 25).

The embodiments of the present invention are described below with reference to the drawings.

Figure 1:
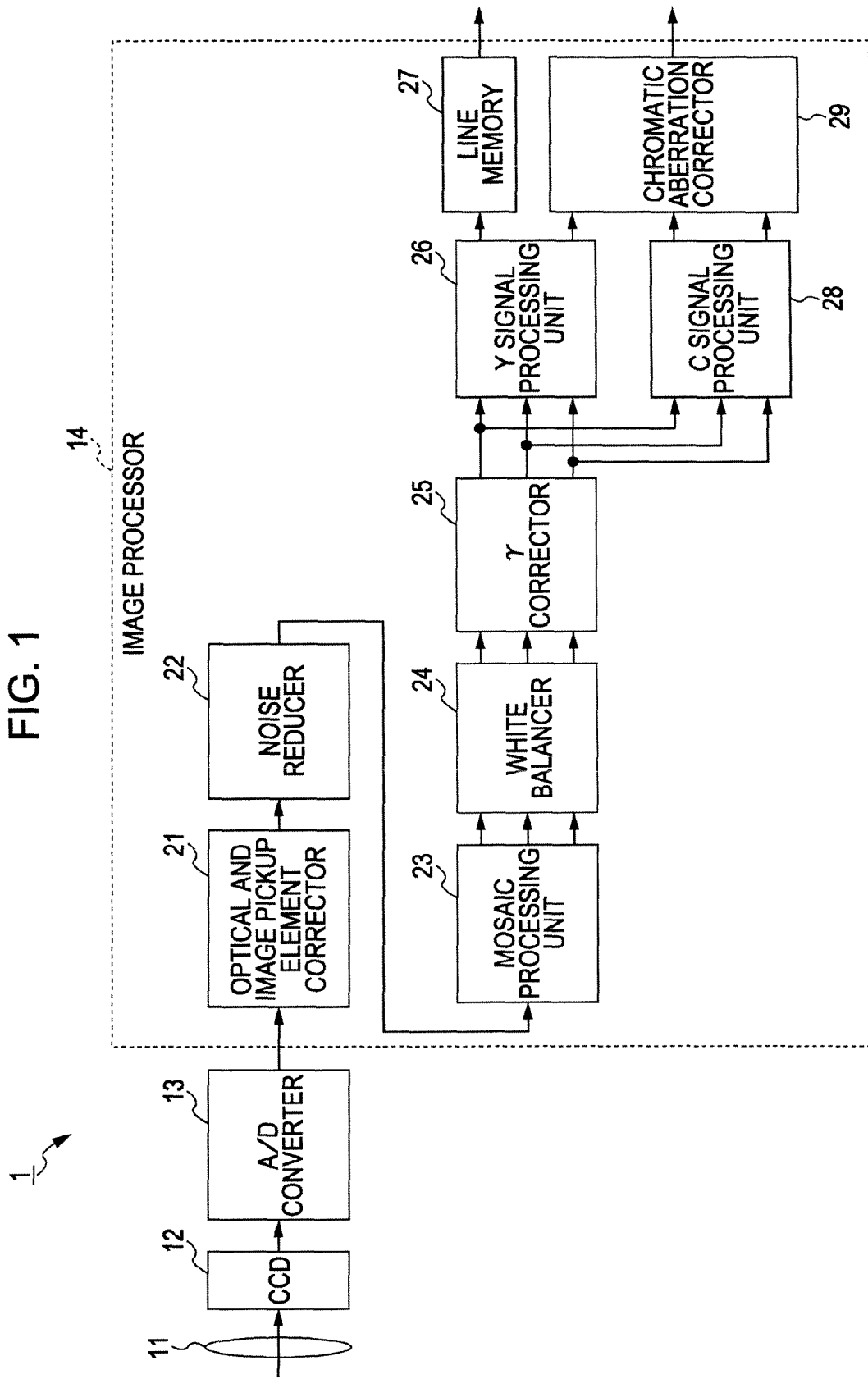
FIG. 1 is a block diagram illustrating a configuration of an image pickup apparatus in accordance with one embodiment of the present invention.

FIG. 1 is a block diagram illustrating a configuration of an image pickup apparatus 1 in accordance with one embodiment of the present invention.

As shown in FIG. 1, the image pickup apparatus 1 obtains as digital data an image by picking up an image of a subject, and includes a lens unit 11, a charge-coupled device (CCD) 12, an analog-to-digital (A/D) converter 13, and an image processor 14.

The lens unit 11, including a lens group and an aperture diaphragm, passes an incident light ray from the subject therethrough, and focuses the light ray on the CCD 12. The CCD 12 is an image pickup element containing a photoelectric converter element such as a photodiode serving as a photoreceiver receiving the incident light ray. The incident light ray entering through the lens unit 11 is received and photoelectrically converted by the photoreceiver into an electrical signal. The electrical signal is output to the A/D converter 13.

Each photodiode of the photoreceiver includes red (R), green (G), and blue (B) color filters. When the incident light ray passes through the color filter, the color filter permits only the color component thereof to pass therethrough and to reach the photo receiver. More specifically, the red (R), green (G), and blue (B) components are incident on different places on the photoreceiver, and photoelectrically converted. The CCD 12 thus outputs electrical signals of the red (R), green (G) and blue (B) components to the A/D converter 13.

The A/D converter 13 converts the electrical signals (analog signals) of the respective color components supplied from the CCD 12 into digital signals. The digital signals (video data) are then supplied to the image processor 14. In response to the supplied video data (R signal, G signal, and B signal), the image processor 14 performs a signal process (image process) on the video data and then outputs the resulting video data as a luminance signal and a color signal.

The image pickup apparatus 1 may further include a recording medium for storing the acquired video data and any other additional element.

As shown in FIG. 1, the image processor 14 includes an optical and image pickup element corrector 21, a noise reducer 22, a mosaic processing unit 23, a white balancer 24, a γ corrector, a Y signal processing unit 26, a line memory 27, a C signal processing unit 28, and a chromatic aberration corrector 29.

The optical and image pickup element corrector 21 corrects effects of the image pickup element and the optical element, such as digital clamping for clamping signals at a black level and shading correction for correcting a peripheral light quantity drop taking place on a peripheral portion of a lens. Upon receiving the video data (R signal, G signal and B signal) from the A/D converter 13, the optical and image pickup element corrector 21 performs the above-described corrections on the video data and then supplies the corrected video data (R signal, G signal and B signal) to the noise reducer 22.

The noise reducer 22 performs a noise reduction (NR) process on noise that could be caused when the CCD 12 performs the photoelectrical conversion process or when the A/D converter 13 performs analog transfer of the video data. Upon receiving the video data (R signal, G signal and B signal) supplied from the optical and image pickup element corrector 21, the noise reducer 22 performs the noise reduction process on the supplied video data and then supplies the noise reduced video data (R signal, G signal and B signal) to the mosaic processing unit 23.

The mosaic processing unit 23 defines a color structure on the R signal, the G signal, and the B signal, which are mutually shifted in spatial phase by the Bayer arrayed color filters in the CCD 12, and generates three RGB plane signals (a set of the R signal, the G signal, and the B signal mutually equal in spatial position). More specifically, the mosaic processing unit 23 performs a mosaic process on the RGB signal (the R signal, the G signal, and the B signal mutually shifted in spatial phase) supplied from the noise reducer 22 to generate the color structure, and thus generates the RGB plane signals. The generated RGB plane signals are fed to the white balancer 24.

The white balancer 24 performs a white balance process on each of the RGB signals at the same spatial position of the RGB plane signals, multiplies the RGB signal by gain so that RGB levels of a white subject become equal to each other, and supplies the resulting RGB signal to the γ corrector 25.

The γ corrector 25 covers variations in characteristics of elements to provide a more naturally looking image by correcting a γ (gamma) value on the supplied RGB signals (the R signal, the G signal, and the B signal). The γ (gamma) value is a rate of a change in a voltage converted value to a change in brightness of an image. The γ corrector 25 supplies the γ corrected RGB signals to each of the Y signal processing unit 26 and the C signal processing unit 28.

The Y signal processing unit 26 generates a luminance signal (Y signal) by calculating the following equation (1) using the RGB signals supplied from the γ corrector 25:

$$Y=0.3R+0.6G+0.1B \quad (1)$$

where Y represents a luminance value (value of the Y signal) R represents a signal level of an R signal (an amount of a red component), G represents a signal level of a G signal (an amount of a G component), and B represents a signal level of a B signal (an amount of a B component).

The Y signal processing unit 26 supplies the resulting luminance signal (Y signal) to each of the line memory 27 and the chromatic aberration corrector 29.

The line memory 27 may include a volatile semiconductor memory such as a static random access memory (SRAM) or a dynamic random access memory (DRAM), and temporarily store the video data on a per horizontal pixel row (line) basis on a screen. The line memory 27 stores a predetermined lines of video data (Y signal), supplied from the Y signal processing unit 26, for a predetermined period of time, and then outputs the Y signal at timing responsive to output timing the chromatic aberration corrector 29 outputs the color signals (Cr signal and Cb signal).

The C signal processing unit 28 calculates the following equations (2) and (3) using the RGB signals supplied from the γ corrector, thereby generating the color signals (Cr signal and Cb signal):

$$Cr(R-Y)=0.7R-0.6G-0.1B \quad (2)$$

$$Cb(B-Y)=-0.3R-0.6G+0.9B \quad (3)$$

where Cr(R−Y) and Cb(B−Y) on the left sides are values of the color signals, and on the right sides, R represents a signal level of a R signal (an amount of a red component), G represents a signal level of a G signal (an amount of a G component), and B represents a signal level of a B signal (an amount of a B component).

The C signal processing unit 28 supplies the resulting color signals (Cr signal and Cb signal) to the chromatic aberration corrector 29.

In response to the supplied Y signal, Cr signal, and Cb signal, the chromatic aberration corrector 29 corrects the chromatic aberrations such as the axial chromatic aberration and the chromatic aberration of magnification contained in the video data, and then supplies the corrected Cr signal and Cb signal.

The chromatic aberration corrector 29 performs an achromatization process on a pixel of interest if the color of an adjacent "white saturation" pixel having any Y signal (one of the RGB signals) at a saturated signal level is violet.

The effect of the chromatic aberration is particularly pronounced in a high-contrast image such as an image showing sunlight through branches of trees. In other words, the chromatic aberration correction is effective in such an image. Conversely, if there is no white saturation, the occurrence of chromatic aberration is not pronounced, and the advantage of chromatic aberration correction is not so large. Typically, a violet color having a small green (G) value is small in the luminance value (Y), and the possibility that the white saturation could take place in the vicinity of a violet pixel is very small. In other words, an originally violet (not violet as a result of chromatic aberration) pixel is unlikely to be present in the area of white saturation. The chromatic aberration corrector 29 corrects (achromatizes) a violet color taking place in the vicinity of the white saturation on the premise that the violet color taking place in the vicinity of the white saturation is due to the chromatic aberration.

By performing the correction taking into consideration the white saturation pixel, the chromatic aberration corrector 29 reduces unnecessary correction and performs more accurate correction.

Violet color and green color sometimes appear due to the chromatic aberration. If the luminance value (Y) is large, the green (G) value also becomes large. An originally green (not green as a result of the chromatic aberration) pixel is highly likely to be present in the area of chromatic aberration. In other words, if the green color is automatically achromatized, the color of leaves of a tree can be missing when sunlight through branches of trees is photographed, for example. The chromatic aberration corrector 29 thus does not correct the green color.

In this way, by performing the chromatic aberration correction on limited color, the chromatic aberration corrector 29 reduces unnecessary corrections, and performs more accurate correction.

Figure 2:
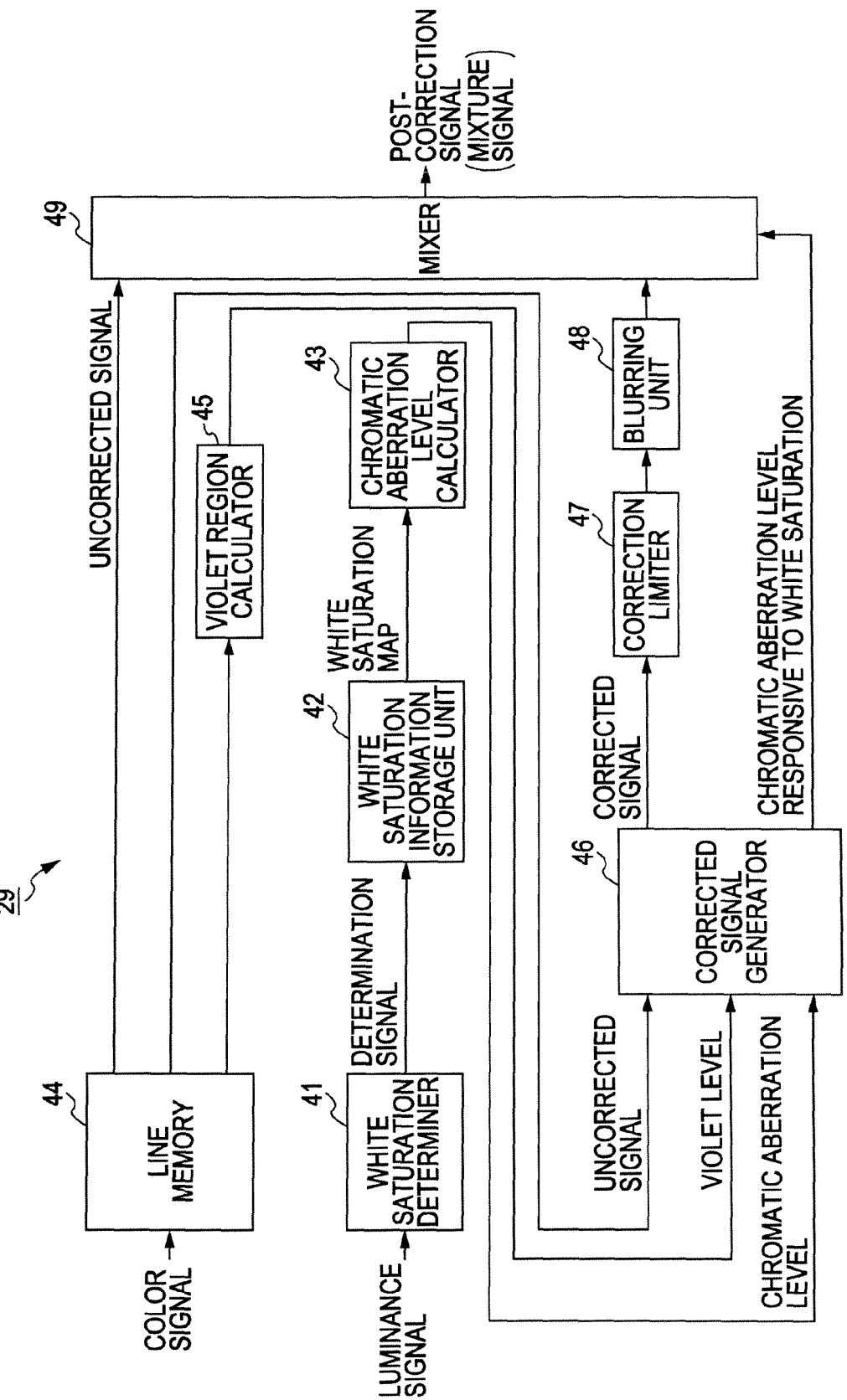
FIG. 2 is a block diagram illustrating in detail a chromatic aberration corrector of FIG. 1.

FIG. 2 is a block diagram illustrating in detail the chromatic aberration corrector 29 of FIG. 1.

As shown in FIG. 2, the chromatic aberration corrector 29 includes a white saturation determiner 41, a white saturation information storage unit 42, a chromatic aberration level calculator 43, a line memory 44, a violet region calculator 45, a corrected signal generator 46, a correction limiter 47, a blurring unit 48, and a mixer 49.

The white saturation determiner 41 determines on each pixel whether a signal level of the luminance signal (Y signal) supplied from the Y signal processing unit 26 (of FIG. 1) is equal to or higher than a predetermined threshold value (whether the luminance value is saturated or not), and supplies the determination result (for example, information of 1 bit) to the white saturation information storage unit 42. The determination method will be described in detail later. The white saturation determiner 41 supplies a value "1" as the determination result for a pixel having white saturation (white saturation pixel) to the white saturation information storage unit 42, while supplying a value "0" as the determination result for a pixel having no white saturation to the white saturation information storage unit 42. There is no limitation to the number of bits of the information indicating the determination result, but the smaller the size of information, the lighter the workload involved in the correction process.

The white saturation information storage unit 42 includes a recording medium such as a random access memory (RAM), and includes a memory area. Using the memory area, the white saturation information storage unit 42 temporarily stores the determination result (information representing whether each pixel is a white saturation pixel or not) of each pixel supplied from the white saturation determiner 41. The white saturation information storage unit 42 generates from the information thereof a white saturation map indicating a distribution of white saturation pixels surrounding a pixel of interest handled in the chromatic aberration level calculator 43 and then supplies the white saturation map to the chromatic aberration level calculator 43. The white saturation map will be described in detail later.

The chromatic aberration level calculator 43 includes a RAM or a read-only memory (ROM), and stores in a memory area thereof a chromatic aberration model as information relating to a correction amount (chromatic aberration level) to the chromatic aberration in the vicinity of the pixel of interest. From the chromatic aberration model, the chromatic aberration level calculator 43 generates a chromatic aberration map indicating a distribution of the chromatic aberration level. The chromatic aberration model and the chromatic aberration map will be described in detail later.

Using the chromatic aberration map and the white saturation map supplied from the white saturation information storage unit 42, the chromatic aberration level calculator 43 calculates the integral value of the chromatic aberration of the pixel of interest with respect to each surrounding white saturation pixel, and supplies the calculated integral value of the chromatic aberration levels to the corrected signal generator 46.

The line memory 44 includes a recording medium such as a RAM, and using a memory area thereof, stores the color signals (Cr signal and Cb signal) supplied from the C signal processing unit 28 on a line by line basis for a predetermined period of time (namely, stores a plurality of lines of color signals). The line memory 44 then supplies part or whole of the color signal stored to each of the violet region calculator 45, the corrected signal generator 46, and the mixer 49 at a predetermined timing.

The violet region calculator 45 calculates a violet level of each pixel (indicating how close to the violet color) from the color signals (Cr signal and Cb signal) supplied from the line memory 44, and then supplies the calculation result to the corrected signal generator 46. The violet region calculator 45 identifies a portion of violet color of a screen (violet region). That calculation method will be described in detail later.

The corrected signal generator 46 calculates the chromatic aberration level responsive to the white saturation (a correction amount to the chromatic aberration level to a violet pixel in the vicinity of the white saturation pixel) based on the chromatic aberration level supplied by the chromatic aberration level calculator 43 and the violet level supplied from the violet region calculator 45. Using the resulting chromatic aberration level, the corrected signal generator 46 performs the chromatic aberration correction on the uncorrected signal as an uncorrected color signal supplied from the line memory 44. The corrected signal generator 46 thus generates the corrected signal. The chromatic aberration level correction process will be described in detail later. The corrected signal generator 46 supplies the generated corrected signal to the correction limiter 47. The corrected signal generator 46 also supplies the chromatic aberration level responsive to the white saturation to the mixer 49.

The correction limiter 47 performs a correction to an amount of drop in chroma saturation on the corrected signal supplied from the corrected signal generator 46. More specifically, the correction limiter 47 detects a portion where the corrected signal generator 46 lowers the chroma saturation too much in the correction, thereby performing a chroma saturation correction process taking into consideration the chroma saturation of surrounding pixels.

The correction limiter 47 performs the correction process by selecting a pixel the corrected signal generator 46 has performed a chroma saturation dropping process, namely, a pixel that has mainly undergone the chromatic aberration level correction process. In the chroma saturation correction, an area where the chroma saturation is lowered is corrected. A pixel having a chroma saturation reduction rate being non-zero is selected. The correction limiter 47 thus acquires information relating to the chroma saturation reduction rate (not shown) together with the corrected signal. The chroma saturation correction process is thus performed on a pixel having a chroma saturation reduction rate being non-zero. The correction limiter 47 supplies the chroma saturation corrected signal to the blurring unit 48.

The blurring unit 48 performs a blurring process on the signal supplied from the correction limiter 47 using a low-pass filter (LPF), thereby correcting correction variations. The blurring unit 48 supplies the resulting corrected signal to the mixer 49.

The correction limiter 47 and the blurring unit 48 further process the corrected signal, thereby reducing an unnaturally pronounced correction in an image. The chromatic aberration corrector 29 thus outputs a more naturally looking chromatic aberration correction result.

The mixer 49 mixes the uncorrected signal supplied from the line memory 44 and the corrected signal supplied from the blurring unit 48 in accordance with the chromatic aberration level responsive to the white saturation supplied from the corrected signal generator 46, thereby generating and outputting a post-correction signal (mixture signal). More specifically, the mixer 49 determines a mixing ratio of the two signals in response to the chromatic aberration level and mixes the two signals (the corrected signal and the uncorrected signal) in accordance with the mixing ratio so that the corrected signal is enhanced in the chromatic aberration corrected pixel and so that the uncorrected signal is enhanced in the pixel that has undergone no chromatic aberration correction. By mixing the two signals, the mixer 49 accounts for the uncorrected signal in the chromatic aberration corrected signal. A more natural post-correction signal results. The mixing process will be described in detail later.

FIG. 3 is a block diagram illustrating in detail the white saturation determiner 41 of FIG. 2.

The white saturation determiner 41 of FIG. 3 includes a white saturation pixel threshold determiner 61, a white saturation pixel determiner 62, and a determination result storage unit 63.

The white saturation pixel threshold determiner 61 references the luminance value of each pixel in the input luminance signal (Y signal), determines whether the luminance value is higher than a predetermined threshold value (whether the signal is saturated or not), and supplies the determination result (threshold determination result) to the white saturation pixel determiner 62. Any value can se set to the threshold value. Since the threshold value serves as a threshold to detect a white saturation pixel, a sufficient large value near the maximum value of a range of the luminance value is set for the threshold value.

The white saturation pixel determiner 62 supplies the determination result from the white saturation pixel threshold determiner 61 to the determination result storage unit 63 for storage. Based on the determination result, the white saturation pixel determiner 62 checks that a pixel of interest is a white saturation pixel. If the pixel of interest is a white saturation pixel, the white saturation pixel determiner 62 acquires the determination result of pixels adjacent to the pixel of interest from the determination result storage unit 63 to determine whether a white saturation pixel is present adjacent to the pixel of interest. The white saturation pixel determiner 62 thus detects a plurality of white saturation pixels consecutively arranged in the vicinity of the pixel of interest. The white saturation pixel determiner 62 supplies to the white saturation information storage unit 42 as the white saturation determination result the determination result thus obtained (information regarding a plurality of adjacent and consecutively arranged white saturation pixels).

The white saturation takes place when a light source is photographed. The white saturation is less likely to take place in a single pixel but more likely to take place across a plurality of pixels. In other words, a white saturation that takes place in a single pixel may be due to a faulty pixel. The white saturation pixel determiner 62 disregards a single white saturation pixel and detects only the white saturation taking place across a plurality of pixels. Detection of faulty pixels is thus controlled.

The white saturation determiner 41 not only performs the threshold value determination with the white saturation pixel threshold determiner 61 but also detects the presence of adjacent white saturation pixels with the white saturation pixel determiner 62. The white saturation determiner 41 can thus detect a white saturation pixel more accurately.

The determination result storage unit 63 can store any type of information as long as the determination result (for example, information of 1 bit) of each pixel in the vicinity of the pixel of interest (within a predetermined range) is stored. The determination result storage unit 63 may store the determination results of all pixels that can be adjacent to the pixel of interest and then delete the determination result of any pixel in the order of pixels that become first free from the possibility of being adjacent to the pixel of interest. The determination result storage unit 63 may store address information of a pixel that has been determined as a white saturation pixel. What information to store using what type of method is optional. Any appropriate method may selected dependent on an amount of information to be stored, and the size of workload involved in the process.

FIG. 4 is a block diagram illustrating in detail the chromatic aberration level calculator 43 of FIG. 2.

The chromatic aberration level calculator 43 of FIG. 4 includes a chromatic aberration model storage unit 71, a chromatic aberration map generator 72, a chromatic aberration map storage unit 73, a chromatic aberration of magnification storage unit 74, a chromatic aberration of magnification corrector 75, and a map comparator 76.

The chromatic aberration model storage unit 71 includes a ROM or a RAM, and pre-stores a chromatic aberration model on a memory area thereof. The chromatic aberration model is model information used to generate a chromatic aberration map indicating the ambient effect of chromatic aberration caused by a single white saturation pixel.

More specifically, the chromatic aberration map indicates a distribution of chromatic aberration level due to a white saturation (the degree of chromatic aberration) occurring in the vicinity of a single white saturation pixel. The chromatic aberration model can be any type of information as long as the information serves the purpose of generating the chromatic aberration map.

The chromatic aberration map will be described in detail later. For example, the chromatic aberration model may be table information indicating a relationship between a range from the white saturation pixel and the chromatic aberration level, and the chromatic aberration map may be map information of chromatic aberration level of each pixel surrounding the white saturation pixel calculated based on the table information. The chromatic aberration model may be part or whole of the chromatic aberration map.

The chromatic aberration model storage unit 71 supplies the chromatic aberration model to the chromatic aberration map generator 72 in response to a request from the chromatic aberration map generator 72.

The chromatic aberration map generator 72 generates the above-described chromatic aberration map using the chromatic aberration model supplied from the chromatic aberration model storage unit 71, and then supplies the chromatic aberration map to the chromatic aberration map storage unit 73.

The chromatic aberration map storage unit 73 contains a RAM or the like, and temporarily stores the chromatic aberration map supplied from the chromatic aberration map generator 72, and then supplies the chromatic aberration map to the map comparator 76 in response to a request from the map comparator 76.

The chromatic aberration of magnification storage unit 74 includes one of a ROM and a RAM, and pre-stores chromatic aberration of magnification information indicating how often the chromatic aberration of magnification takes place in each pixel on a screen. The chromatic aberration of magnification that a difference in waveform appears in a difference in image magnification will be described in detail later. The chromatic aberration of magnification takes place in the peripheral area of the screen. The chromatic aberration of magnification information is thus related to a relationship between a position on the screen and a chromatic aberration of magnification level, and may be in the form of table information or formula. The chromatic aberration of magnification storage unit 74 supplies the chromatic aberration of magnification information to the chromatic aberration of magnification corrector 75 in response to a request from the chromatic aberration of magnification corrector 75.

The chromatic aberration of magnification corrector 75 acquires the chromatic aberration of magnification information from the chromatic aberration of magnification storage unit 74 for reference, and determines whether a chromatic aberration of magnification takes place in a pixel of interest in the map comparator 76. If a chromatic aberration of magnification takes place, the chromatic aberration of magnification corrector 75 corrects the chromatic aberration map stored on the chromatic aberration map storage unit 73 in accordance with the chromatic aberration of magnification information. The chromatic aberration map storage unit 73 supplies the corrected chromatic aberration map to the map comparator 76 to process the pixel of interest.

The chromatic aberration map storage unit 73 thus supplies the chromatic aberration map to the map comparator 76 on a pixel by pixel basis.

The map comparator 76 matches the chromatic aberration map against the white saturation map supplied from the white saturation information storage unit 42 (of FIG. 2), thereby calculating the chromatic aberration level responsive to the white saturation in each pixel and then supplying the chromatic aberration level to the corrected signal generator 46. The map comparator 76 will be described in detail later.

A correction amount may be determined based on a range from a pixel to be corrected (pixel of interest) to an adjacent white saturation pixel. In practice, the chromatic aberration level is determined based on the presence of a high-contrast subject surrounding the pixel to be corrected. Rather than calculating a correction value based on the range to the closet white saturation pixel, the map comparator 76 calculates a correction value by integrating all white saturation information, because processing becomes easy and the chromatic aberration level can be calculated more accurately.

Since the chromatic aberration level is calculated taking into consideration the chromatic aberration of magnification, the chromatic aberration level calculator 43 can calculate the chromatic aberration level more accurately.

Figure 5:
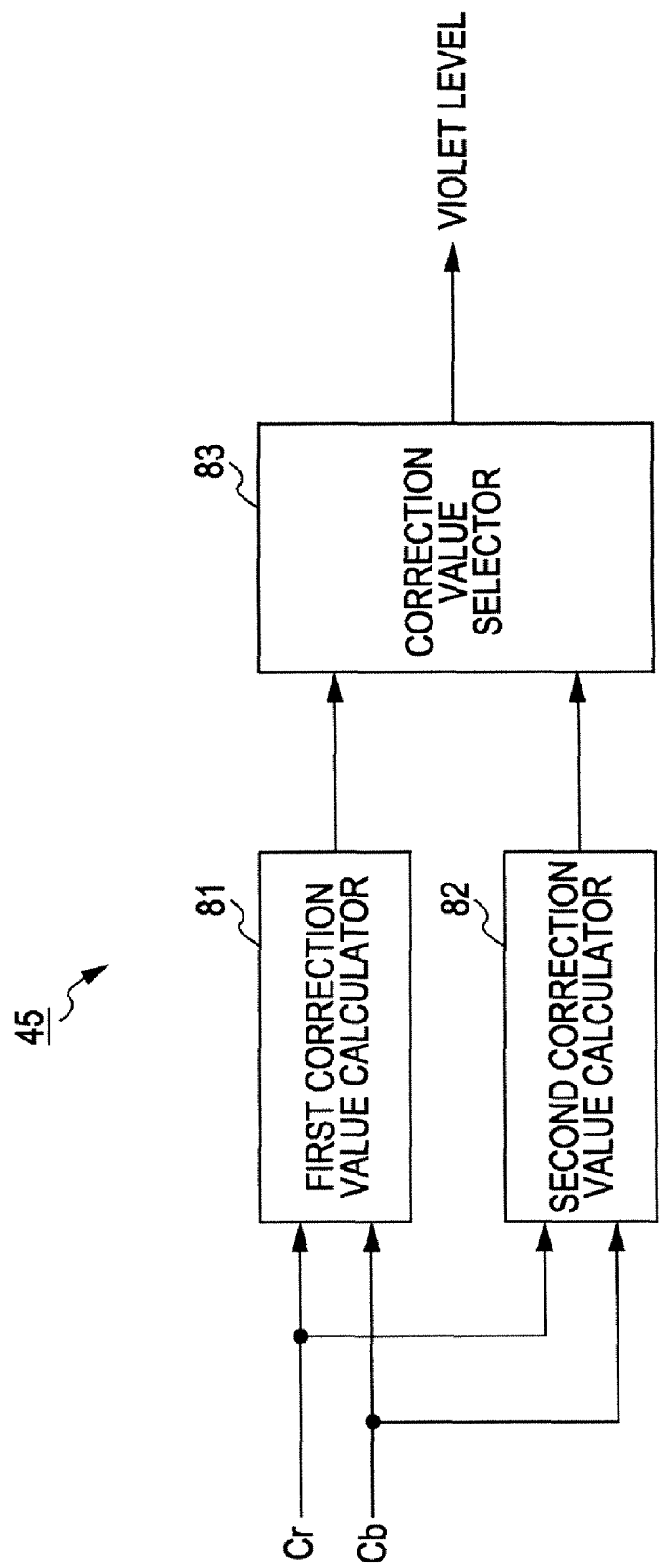
FIG. 5 is a block diagram illustrating in detail a violet region calculator of FIG. 2.

FIG. 5 is a block diagram illustrating in detail the violet region calculator 45 of FIG. 2.

The violet region calculator 45 of FIG. 5 includes a first correction value calculator 81, a second correction value calculator 82, and a correction value selector 83.

The violet region calculator 45 detects a violet color as a color of a pixel to be corrected, and outputs a value having a larger weight to a violet region (violet level). As will be described later, two correction equations are used to calculate two correction values from the color signal value, and one of the two correction values is selected.

The first correction value calculator 81 calculates from the Cr signal and the Cb signal one correction value (first correction value) using one of the correction equations, and supplies the correction value to the correction value selector 83. The second correction value calculator 82 calculates from the Cr signal and the Cb signal the other correction value (second correction value) using the other correction equation and supplies the other correction value to the correction value selector 83.

The correction value selector 83 selects the first correction value supplied from the first correction value calculator 81 or the second correction value supplied from the second correction value calculator 82, whichever is smaller, and outputs the selected correction value as a violet level.

The two correction equations (to be discussed in detail later) used by the first correction value calculator 81 and the second correction value calculator 82 attach weight to the violet level.

In the above discussion, the violet region calculator 45 calculates the violet level using the correction equations. The calculation method of the violet level is not limited to that method. For example, the violet region calculator 45 may calculate the violet level using table information.

Figure 6:
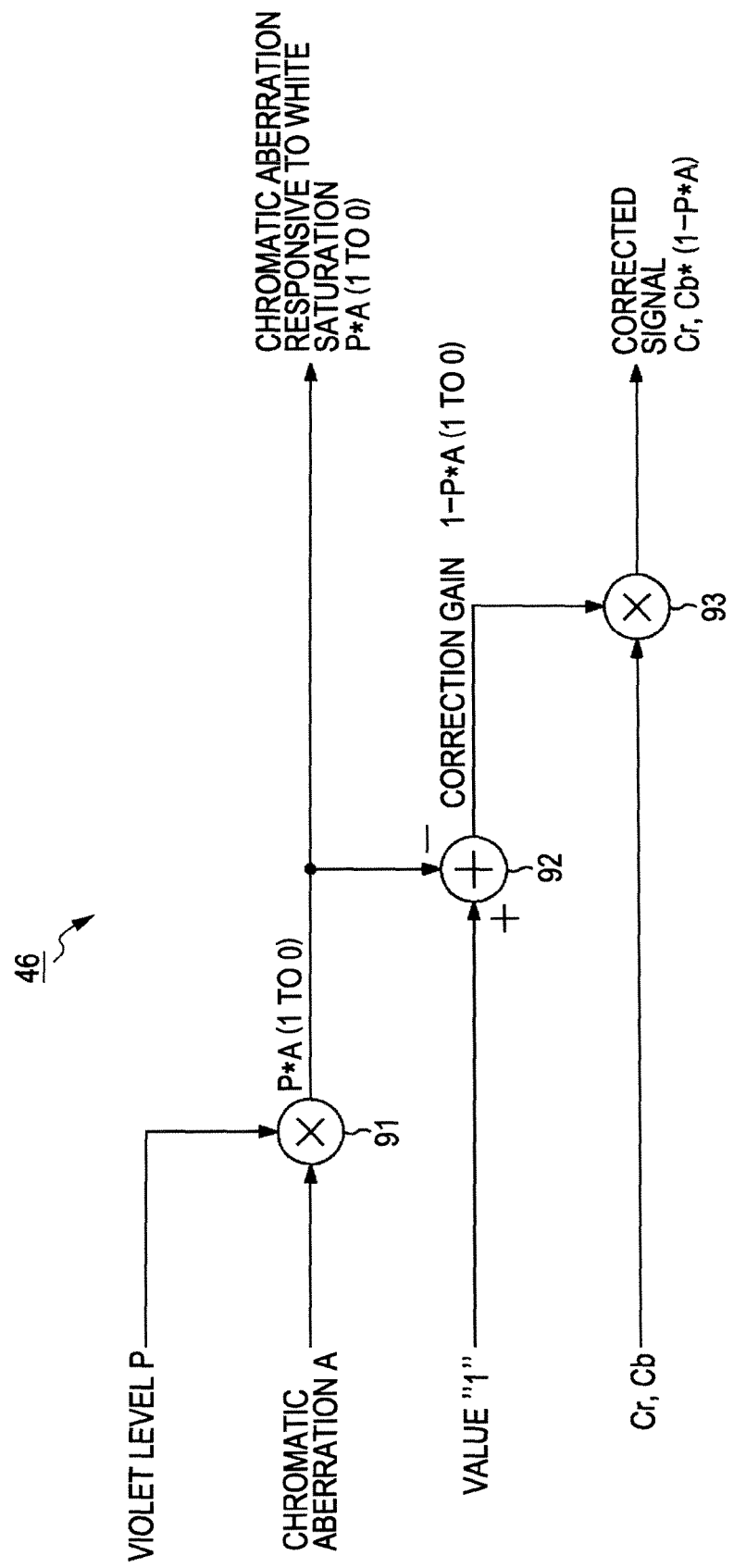
FIG. 6 is a block diagram illustrating in detail a corrected signal generator of FIG. 2.

FIG. 6 is a block diagram illustrating in detail the corrected signal generator 46 of FIG. 2.

The corrected signal generator 46 of FIG. 6 includes a multiplier 91, a subtractor 92, and a multiplier 93.

The multiplier 91 multiplies a violet level P by a chromatic aberration level A, and supplies a chromatic aberration level (achromatizing gain) P*A ($0 \leq 1*\leq 1$) responsive to the white saturation as the product to each of the subtractor 92 and the mixer 49 (FIG. 2).

The subtractor 92 subtracts from a value "1" the chromatic aberration level P*A responsive to the white saturation, thereby calculating a correction gain 1−P*A ($0 \leq -P*A \leq 1$) by inverting the chromatic aberration level responsive to the white saturation, and supplying the correction gain 1−P*A to the multiplier 93.

The subtractor 92 calculates Cr*(1−P*A) and Cb*(1−P*A) by multiplying the color signal values (Cr and Cb) by the correction gain 1−P*A, and supplies the resulting products to the correction limiter 47.

By multiplying the violet level P by the chromatic aberration A, the multiplier 91 can set a large chromatic aberration level (chromatic aberration level responsive to the white saturation) of the pixel of interest to a pixel within a violet region present in the vicinity of the white saturation (a region where violet is likely to be caused by the chromatic aberration and the chromatic aberration level is high).

The subtractor 92 and the multiplier 93 are used to invert the chromatic aberration level P*A responsive to the white saturation and multiply the color signal value (Cr and Cb) by the inverted chromatic aberration level P*A responsive to the white saturation. The corrected signal generator 46 performs on the color signal the correction process responsive to the chromatic aberration level set by the multiplier 91.

More specifically, the corrected signal generator 46 with a simple configuration thereof performs the correction process on the chromatic aberration more easily and more accurately.

Figure 7:
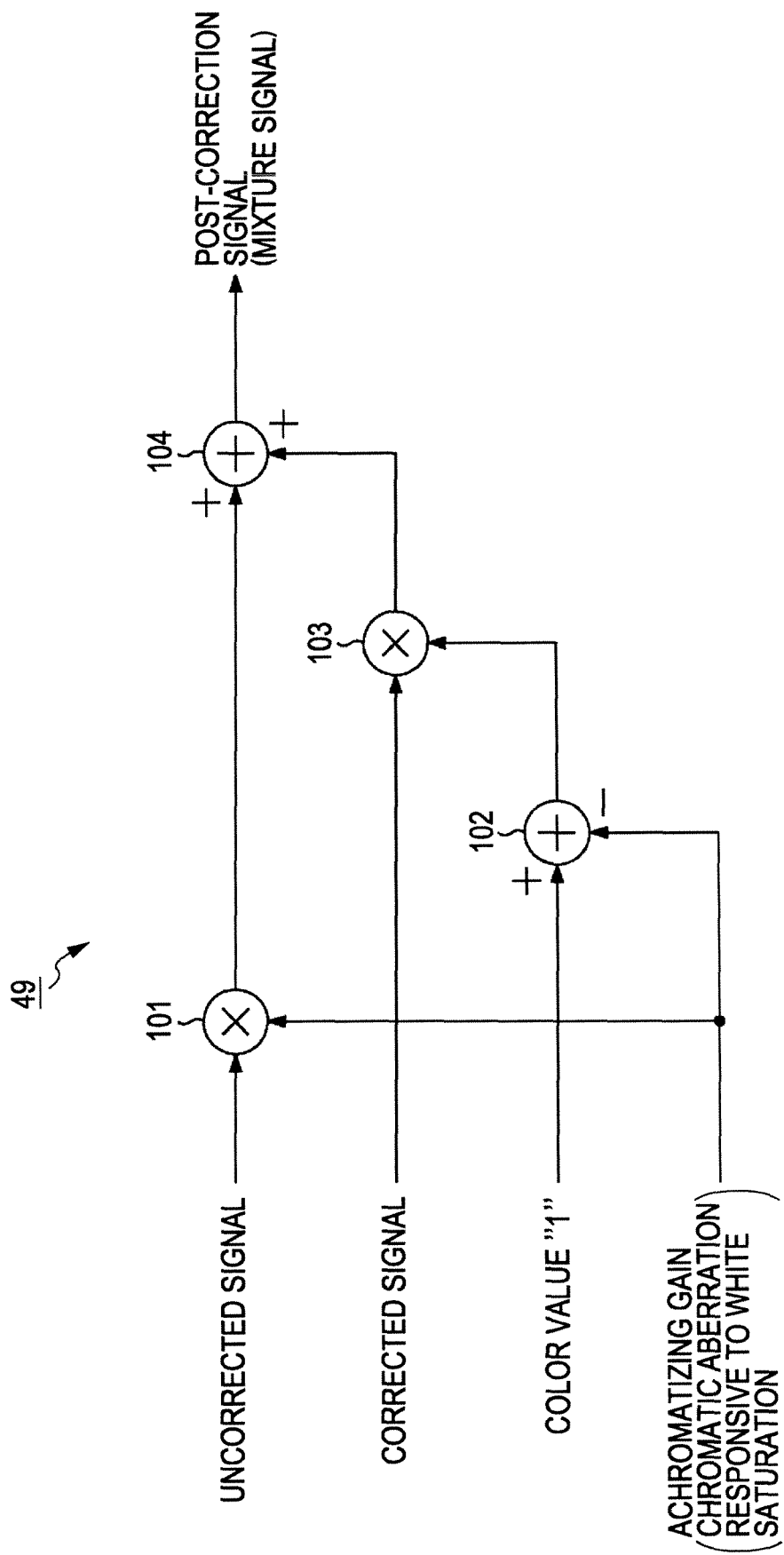
FIG. 7 is a block diagram illustrating in detail a mixer of FIG. 2.

FIG. 7 is a block diagram illustrating in detail the mixer 49 of FIG. 2.

The mixer 49 of FIG. 7 includes a multiplier 101, a subtractor 102, a multiplier 103 and an adder 104.

The multiplier 101 multiplies the uncorrected signal by the achromatizing gain (chromatic aberration level responsive to the white saturation) P*A, and then supplies the resulting product to the adder 104.

The subtractor 102 subtracts the achromatizing gain P*A from the value "1," thereby inverting the achromatizing gain P*A and calculating the correction gain 1−P*A, and supplies the correction gain 1−P*A to the multiplier 103.

The multiplier 103 multiplies the corrected signal supplied from the multiplier 101 by the correction gain 1−P*A that is the inverted value of the achromatizing gain P*A, and then supplies the resulting product to the adder 104.

The adder 104 adds the resulting product from the multiplier 101 to the resulting product from the multiplier 103, and then outputs the resulting sum as a post-correction signal (mixture signal).

More specifically, the multiplier 101 and the multiplier 103 in the mixer 49 respectively attach, to the uncorrected signal and the corrected signal, weights responsive to the values of the achromatizing gains, and the adder 104 in the mixer 49 sums (mixes) these outputs to generate the post-correction signal (mixture signal). The chromatic aberration corrector 29 can further account for the uncorrected image in the corrected image. A more natural and appropriate chromatic aberration correction result is thus obtained.

The flow of the above-described process steps is described below.

The image processing of the image processor 14 of FIG. 1 is described below with reference to a flowchart of FIG. 8.

When the video signal (digital data) is supplied from the A/D converter 13, the image processor 14 starts image processing. When the image processing starts, the optical and image pickup element corrector 21 performs an optical and pickup element correction process on the video signal in step S1. In step S2, the noise reducer 22 performs a noise reduction process on the video signal. In step S3, the mosaic processing unit 23 performs a mosaic process on the video signal. In step S4, the white balancer 24 performs a white balance process on the video signal. In step S5, the γ corrector 25 performs a γ process on the video signal.

Upon completion of the γ process, the Y signal processing unit 26 generates a luminance signal (Y signal) from the γ corrected video signal (RGB signal) in step S6. In step S7, the line memory 27 stores the luminance signal (Y signal). In step S8, the C signal processing unit 28 generates the color signals (Cr signal and Cb signal) from the γ corrected video signal (RGB signal).

In step S9, the chromatic aberration corrector 29 performs a chromatic aberration correction process to correct the chromatic aberration of the color signal generated by the C signal processing unit 28 using the luminance signal generated by the Y signal processing unit 26. The chromatic aberration correction process will be described in detail with reference to a flowchart of FIG. 9 later. When the chromatic aberration correction process is complete, the line memory 27 and the chromatic aberration corrector 29 respectively output the luminance signal and the color signal with one in association with the other to the outside of the image processor 14. The image processing is thus completed.

The image processor 14 repeats the above-described image processing, thereby processing the video signal supplied from the A/D converter 13. The image processor 14 performs the chromatic aberration correction on the video signal more easily and more accurately.

Figure 8:
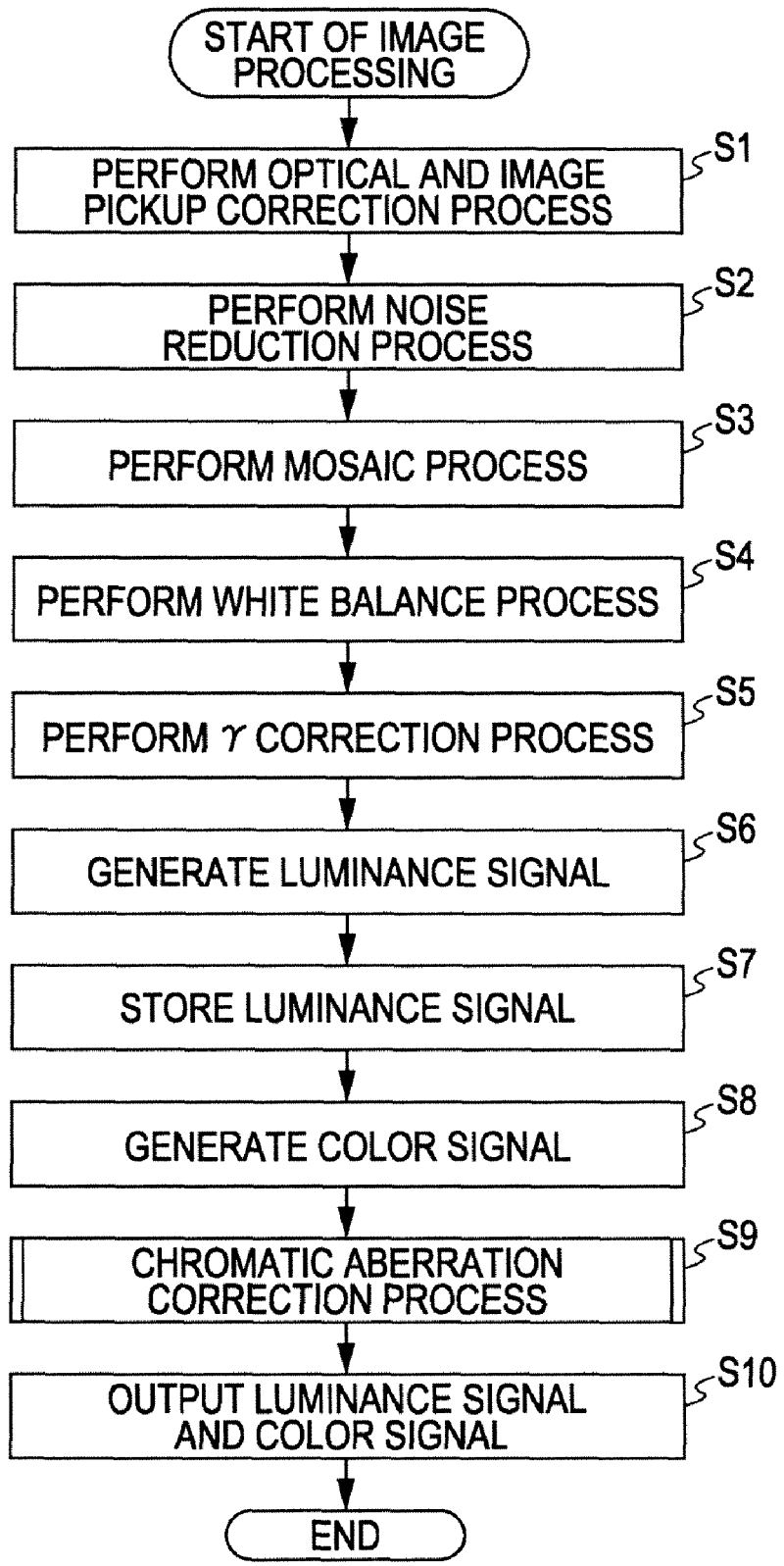
FIG. 8 is a flowchart illustrating a flow of an image processing operation.
Figure 10:
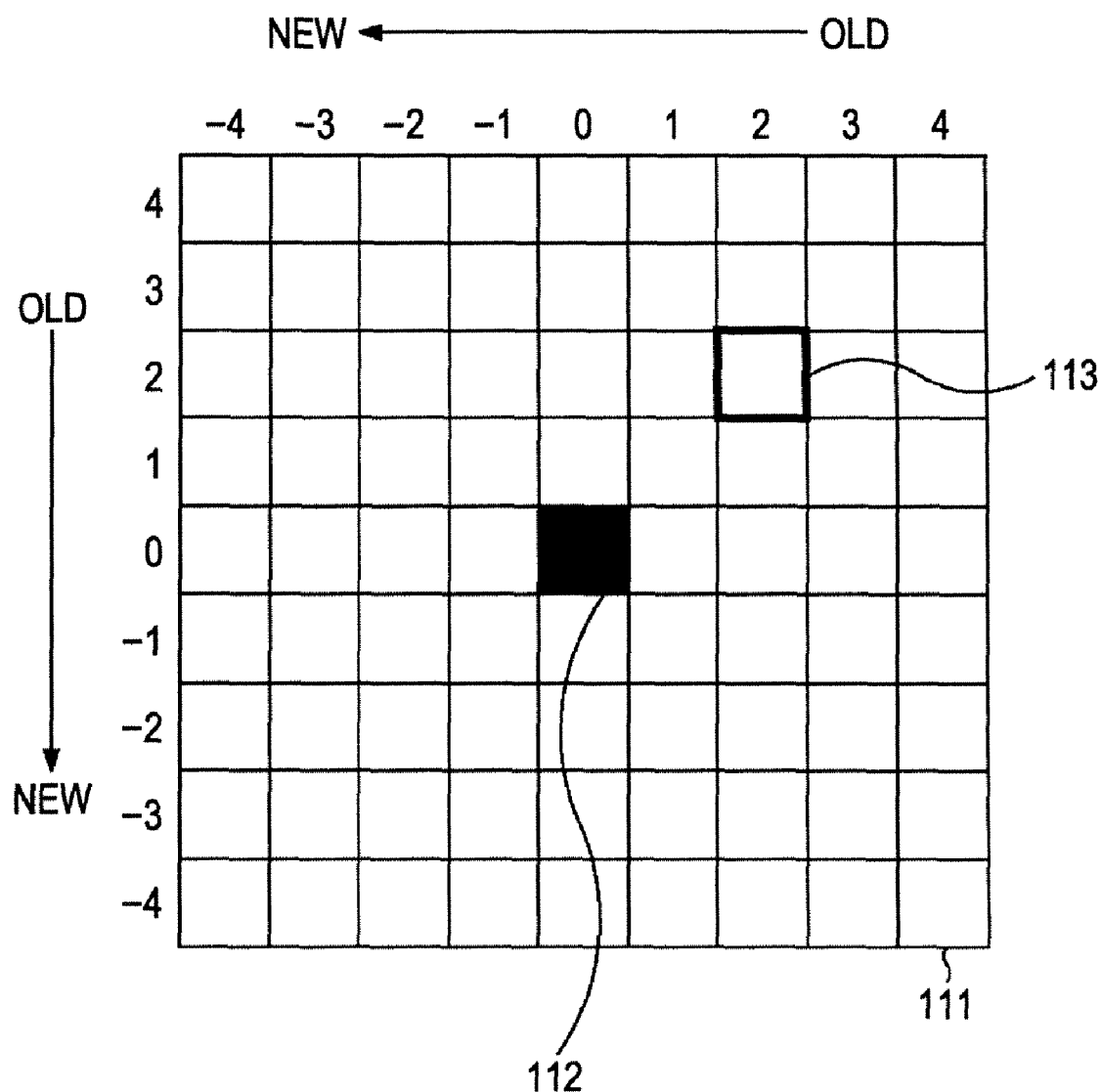
FIG. 10 illustrates a structure of a white saturation map.

The chromatic aberration correction process performed in step S9 of FIG. 8 is described below with reference to the flowchart of FIG. 9. FIG. 10 is also referred to as necessary.

When the chromatic aberration correction process starts, the white saturation determiner 41 performs in step S21 a white saturation determination process on the luminance signal (Y signal) supplied from the Y signal processing unit 26. The white saturation determination process will be described in detail below with reference to a flowchart of FIG. 11. When the white saturation determination process is complete, the white saturation information storage unit 42 stores the determination result in step S22. As shown in FIG. 10, the white saturation information storage unit 42 generates in step S23 a white saturation map of a pixel of interest in the chromatic aberration level correction process of the chromatic aberration level calculator 43.

FIG. 10 illustrates the structure of the white saturation map.

As shown in FIG. 10, the white saturation map 111 is map information indicating a distribution of a white saturation pixel 113 in the vicinity of a pixel of interest 112. The white saturation map 111 is map information of 9×9 pixels centered on the pixel of interest 112. An x coordinate is graduated with "−4," "−3," "−2," . . . , "4" from left to right with respect to coordinates (0,0) of the pixel of interest, and a y coordinate is graduated with "−4,"1 "−3," "−2," . . . , "4" from down to up. The white saturation map 111 contains relative coordinate information of the white saturation pixel 113 within a predetermined area with respect to the pixel of interest 112. In this case, the coordinates of the white saturation pixel 113 are (2,2).

In the video signal processed by the image processor 14, the pixel values of pixels are arranged in a line from the leftmost pixel to the rightmost pixel, and then lines of pixel values of pixels are arranged from the top line to the bottom line. The video signal proceeds rightward from the pixel at the top left corner one pixel by one pixel, and then downward one line by one line.

Since the white saturation information storage unit 42 stores the determination results in this processing order, the pixel arrangement of the white saturation map 111 of FIG. 10 corresponds to an image of the video signal to be processed (opposite direction namely, from left to right). The white saturation map 111 of FIG. 10 is a matrix of the determination results. In the white saturation map 111, the smaller the coordinate value (the more left in the horizontal direction and the more downward in the vertical direction), the more recently the determination result is obtained.

The white saturation map 111 may be any type of information as long as the information is substantially identical to the information of FIG. 10.

Returning to FIG. 9, the white saturation information storage unit 42 having produced such a white saturation map supplies the generated white saturation map to the chromatic aberration level calculator 43. When the white saturation map is obtained, the chromatic aberration level calculator 43 performs the chromatic aberration level correction process in step S24. The chromatic aberration level correction process will be described below with reference to the flowchart of FIG. 12.

The violet region calculator 45 acquires the color signal from the line memory 44, and performs the violet region calculation process in step S25. The violet region calculation process will be described below with reference to a flowchart of FIG. 17.

In step S26, the corrected signal generator 46 performs the corrected signal generation process. The corrected signal generation process will be described below with reference to a flowchart of FIG. 19. When the corrected signal generation process is complete, the correction limiter 47 performs a correction limitation process on the corrected signal in step S27. In step S28, the blurring unit 48 performs a blurring process.

In step S29, the mixer 49 performs a mixing process for mixing the uncorrected signal and the corrected signal in accordance with the chromatic aberration level responsive to the white saturation (achromatizing gain). The mixing process will be described below with reference to a flowchart of FIG. 20. When the mixing process is complete, the post-correction signal is output. The chromatic aberration corrector 29 completes the chromatic aberration level correction process. Processing returns to step S9 of FIG. 8 to perform step S10 and subsequent steps.

Each of the processes of FIG. 9 is described below. The white saturation determination process performed in step S21 of FIG. 9 is described below with reference to the flowchart of FIG. 11.

In response to the supplied luminance signal, the white saturation determiner 41 starts the white saturation determination process. When the white saturation determination process starts, the white saturation pixel threshold determiner 61 performs in step S41 the white saturation determination process on a pixel of interest as a pixel to be processed. More specifically, the white saturation pixel threshold determiner 61 compares the luminance value of the pixel of interest in the input luminance signal with a pre-stored predetermined threshold value, thereby determining whether the pixel of interest can be a white saturation pixel (whether the luminance value is saturated or not).

In step S42, the determination result storage unit 63 acquires the threshold determination result of the pixel of interest via the white saturation pixel determiner 62 for storage. In step S43, the white saturation pixel determiner 62 determines based on the threshold value determination result whether the white saturation pixel threshold determiner 61 has determined the pixel of interest as a white saturation pixel. If it is determined that the pixel of interest is a white saturation pixel, the white saturation pixel determiner 62 proceeds to step S44. In step S44, the white saturation pixel determiner 62 acquires the determination results of the pixels adjacent to the pixel of interest (for example, 9×9 pixels centered on the pixel of interest as shown in FIG. 10).

Upon receiving the determination results of the adjacent pixels, the white saturation pixel determiner 62 determines in step S45 based on the determination results of the adjacent pixels whether a pixel determined to be a white saturation pixel is present in the vicinity of the pixel of interest. If it is determined in step S45 that a pixel determined to be a white saturation pixel is present in the vicinity of the pixel of interest, processing proceeds to step S46. In step S46, the white saturation pixel determiner 62 determines the pixel of interest as a white saturation pixel and supplies the determination result to the white saturation information storage unit 42. Upon supplying the determination result to the white saturation information storage unit 42, the white saturation pixel determiner 62 completes the white saturation determination process and then returns to step S21 of FIG. 9 to perform step S22 and subsequent steps.

If it is determined in step S45 that there are not pixels to be determined as a white saturation pixel in the vicinity of the pixel of interest, the white saturation pixel determiner 62 proceeds to step S47. The white saturation pixel determiner 62 disregards the pixel of interest as a faulty pixel, and then supplies the determination result to the white saturation information storage unit 42. Upon supplying the determination result to the white saturation information storage unit 42, the white saturation pixel determiner 62 completes the white saturation determination process. Processing returns to step S21 of FIG. 9 to perform step S22 and subsequent steps.

If the white saturation pixel threshold determiner 61 determines in step S43 that the pixel of interest is not a white saturation pixel, the white saturation pixel determiner 62 proceeds to step S48, disregards the pixel of interest as being non-white-saturated, and supplies the determination result thereof to the white saturation information storage unit 42. Upon supplying the determination result, the white saturation pixel determiner 62 completes the white saturation determination process, and returns to step S21 of FIG. 9 to perform step S22 and subsequent steps.

The determination as to whether the pixel of interest is a white saturation pixel is performed taking into consideration not only the threshold determination result of the pixel of interest but also the determination result of the adjacent pixels. The white saturation determiner 41 thus disregards the white saturation of a faulty pixel, thereby performing the white saturation determination process more accurately. Using the detection result of the white saturation pixel, the chromatic aberration corrector 29 can perform the chromatic aberration correction more accurately.

The chromatic aberration level correction process performed in step S24 of FIG. 9 is described below with reference to the flowchart of FIG. 12. FIGS. 13 through 16 are also referenced as necessary.

When the chromatic aberration level correction process starts, the chromatic aberration map generator 72 acquires a chromatic aberration model from the chromatic aberration model storage unit 71 in step S61. In step S62, the chromatic aberration map generator 72 generates a chromatic aberration map 121 of FIG. 13 based on the chromatic aberration model.

Figure 13:
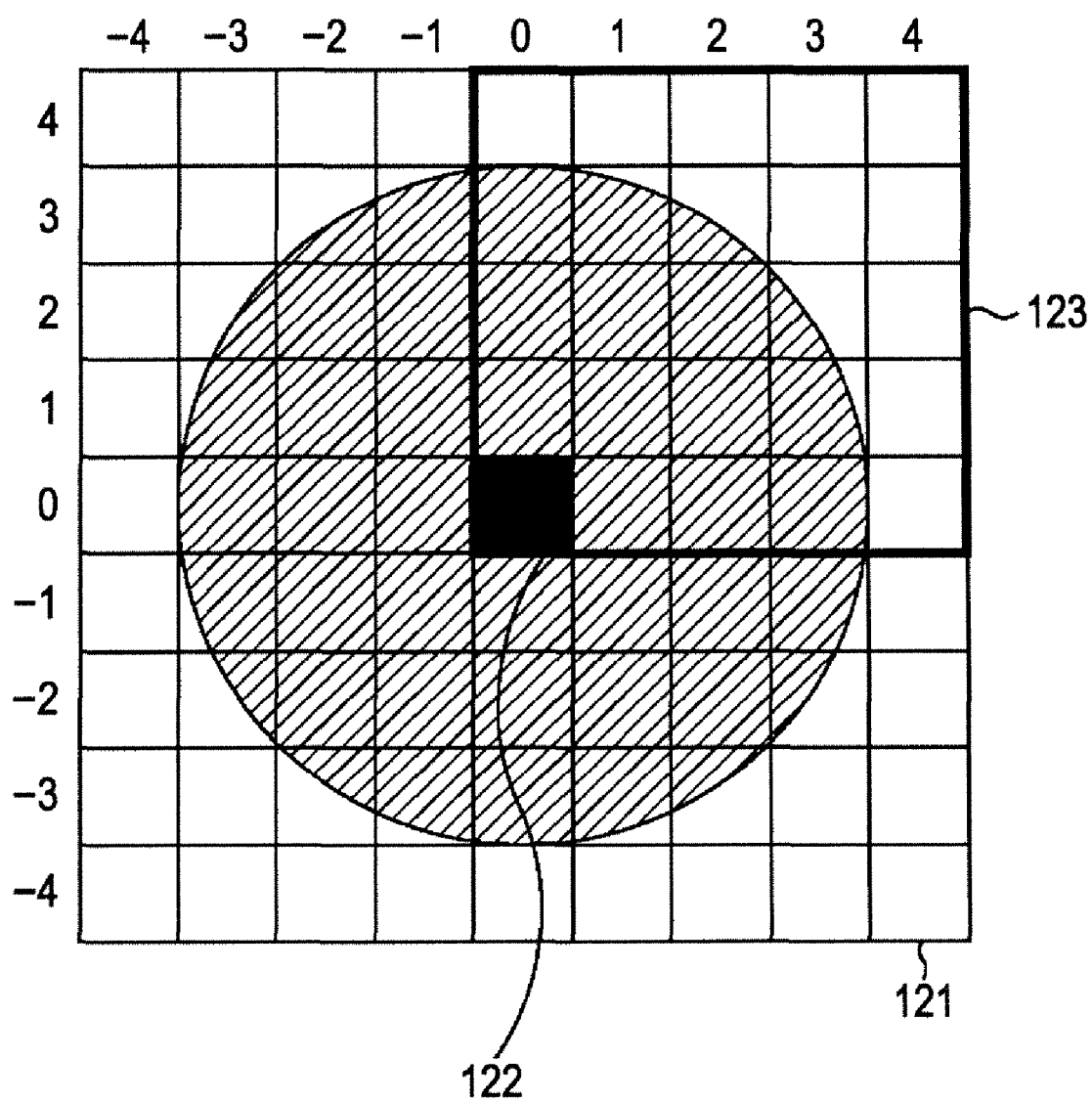
FIG. 13 illustrates a structure of a chromatic aberration map.

FIG. 13 diagrammatically illustrates the structure of the chromatic aberration map 121.

As shown in FIG. 13, the chromatic aberration map 121 is map information indicating a distribution of chromatic aberration levels surrounding the pixel of interest. As the white saturation map 111 of FIG. 10, the chromatic aberration map 121 is composed of 9×9 pixels centered on the pixel of interest 122 to be processed. However, in the chromatic aberration map 121, all of 9×9 pixels are assigned chromatic aberration levels. As shown in FIG. 13, the chromatic aberration map 121 is a 9×9 matrix of information of 81 chromatic aberration levels.

The chromatic aberration map may be only a portion of the chromatic aberration map 121 as represented by a frame 123 of FIG. 13. In this way, an amount of information of the chromatic aberration map is reduced and the workload involved in each process step of the chromatic aberration map is also reduced. This arrangement also leads to a reduction in the scale of circuit arrangement and a cost reduction in manufacture and operation. As will be described later, the chromatic aberration map is matched against the white saturation map 111 of FIG. 10. When only the information within the frame 123 is used, a matching process is performed after coordinates conversion is performed.

Returning to FIG. 12, the chromatic aberration map is generated. The chromatic aberration map storage unit 73 acquires the chromatic aberration map for storage in step S63 for storage. In step S64, the map comparator 76 acquires the white saturation map of the pixel of interest from the white saturation information storage unit 42. The white saturation information storage unit 42 extracts the determination result of the pixels adjacent to the pixel of interest provided by the map comparator 76 from a group of determination results supplied from the white saturation determiner 41. The map comparator 76 generates the white saturation map of the pixel of interest and then supplies the white saturation map to the map comparator 76 at a predetermined timing. Optionally, the map comparator 76 may request the white saturation information storage unit 42 to supply the white saturation map and the white saturation information storage unit 42 may supply the white saturation map to the map comparator 76 in response to the request.

In step S65, the chromatic aberration of magnification corrector 75 acquires the chromatic aberration of magnification information from the chromatic aberration of magnification storage unit 74. The chromatic aberration of magnification is a phenomenon in which a difference in wavelength of the colors appears as a difference in magnification. Due to the chromatic aberration of magnification, a distortion takes place in the distribution of the chromatic aberration close to the edge of a screen 131 as shown in FIG. 14.

FIG. 14 diagrammatically illustrates an example of the chromatic aberration of magnification. As shown in FIG. 14, in an area peripheral to a pixel 132A in the approximate center of the screen 131, no pronounced chromatic aberration of magnification takes place, and an axial chromatic aberration caused by shifting of a focal point on an optical axis with wavelength is predominant. A chromatic aberration distribution 133A extends substantially uniformly from the pixel 132A as the center thereof. In contrast, on the edge portion of the screen 131, a pronounced chromatic aberration of magnification takes place, causing non-uniformity in the chromatic aberration distribution. As shown in FIG. 14, for example, the center of a distribution 133B of the pixel 132B at the top left corner of the screen 131 is shifted from the center of the pixel 132B left-upwardly, and the center of a distribution 133C of a pixel 132C at the bottom right corner of the screen 131 is shifted from the center of the pixel 132C right-downwardly.

The chromatic aberration map needs to be corrected in accordance with a position of each pixel on the screen. In step S65 of FIG. 12, the chromatic aberration of magnification acquired by the chromatic aberration of magnification corrector 75 contains information regarding such a shift between the position on the screen and the chromatic aberration distribution. In step S66 of FIG. 12, the chromatic aberration of magnification corrector 75 references the acquired chromatic aberration of magnification information and determines based on the position of the pixel of interest within the screen whether the chromatic aberration of magnification correction is necessary.

When the pixel of interest is near the edge of the screen and it is determined that the chromatic aberration of magnification correction is to be performed, the chromatic aberration of magnification corrector 75 proceeds to step S67 to calculate a map shift amount of the chromatic aberration map based on the chromatic aberration of magnification information. In step S68, the chromatic aberration of magnification corrector 75 shifts the chromatic aberration map stored on the chromatic aberration map storage unit 73, thereby generating a chromatic aberration map with the shift thereof due to the chromatic aberration of magnification corrected. The corrected chromatic aberration map is also stored on the chromatic aberration map storage unit 73.

Subsequent to step S68, the chromatic aberration of magnification corrector 75 proceeds to step 69. If the chromatic aberration of magnification corrector 75 determines in step S66 that the pixel of interest is near the center of the screen and that the chromatic aberration of magnification correction is not necessary, the chromatic aberration of magnification corrector 75 proceeds to step S69 skipping steps S67 and S68.

In step S69, the map comparator 76 acquires the chromatic aberration map stored on the chromatic aberration map storage unit 73 (the corrected chromatic aberration map if the chromatic aberration of magnification has been corrected), and calculates the chromatic aberration level based on the white saturation map and the chromatic aberration map.

FIGS. 15A-15C illustrate a matching method performed with no chromatic aberration of magnification occurring.

In a white saturation map 140 as shown in FIG. 15A, a pixel of interest 141 has coordinates (0,0) and a white saturation pixel 142 is present at coordinates (2,2) close to the pixel of interest 141. The map comparator 76 shifts each pixel of the white saturation map 140 (by adding "−2" to the x coordinate and the y coordinate) in order to match the pixel of interest having coordinates (0,0) in the chromatic aberration map against the white saturation pixel 142. As shown in FIG. 15B, the chromatic aberration map 143 is a portion of a distribution 144. With the pixels shifted, the white saturation pixel 142 is matched against the center of the distribution 144 (the pixel of interest in the chromatic aberration map 143).

Through the matching process, the coordinates of the pixel of interest 141 in the white saturation map 140 are shifted to (−2,−2) and are not positioned in the chromatic aberration map 143. As shown in FIG. 15C, coordinates conversion is performed to convert the x coordinate and y coordinate to the absolute values thereof. The pixel of interest 141 is thus shifted to a position of a pixel of interest 145 at coordinates (2,2) to be within the chromatic aberration map 143.

The chromatic aberration level at coordinates (2,2) of the pixel of interest 145 becomes the chromatic aberration level of the pixel of interest 141 arising from the white saturation pixel 142. If a plurality of white saturation pixels are present in the vicinity of the pixel of interest of the white saturation map 140, the map comparator 76 performs the above-described matching process to each of the white saturation pixels and treats the integral value (sum) of the chromatic aberration levels of the white saturation pixels as a chromatic aberration level of the pixel of interest.

In this way, the map comparator 76 matches the white saturation pixel in the white saturation map against the pixel of interest in the chromatic aberration map, performs the coordinates conversion process as necessary to shift the pixel of interest into the chromatic aberration map, determines the chromatic aberration level of the pixel of interest from the chromatic aberration level for each of the white saturation pixels in the white saturation map, and then treats the integral value of the chromatic aberration levels of all the white saturation pixels as the chromatic aberration level of the pixel of interest.

In other words, the map comparator 76 matches the pixel of interest in the white saturation map against the pixel of interest in the chromatic aberration map, performs the coordinates conversion as necessary, shifts the white saturation pixel into the chromatic aberration map, determines all chromatic aberration levels at the positions of the white saturation pixels from the chromatic aberration map, and treats the integral value of the chromatic aberration levels as the chromatic aberration level of the pixel of interest.

In the actual chromatic aberration, the chromatic aberration level of the pixel of interest is determined depending on high-contrast subjects surrounding the pixel of interest to be processed. As previously described, the chromatic aberration level calculator 43 applies the chromatic aberration map to all white saturation pixels in a correction area (within the white saturation map), and calculates the chromatic aberration level by integrating information from all white saturation pixels. This method calculates the chromatic aberration level more accurately than the method of determining a correction amount in response to a range from the pixel of interest to be processed to the closest white saturation pixel. The map information is simply matched, requiring no complicated calculation such as the method of determining a correction amount in response to a range from the pixel of interest to be processed to the closest white saturation pixel. The chromatic aberration level calculator 43 can easily calculate the chromatic aberration level. The chromatic aberration corrector 29 performs the chromatic aberration correction more easily and more accurately.

FIGS. 16A through 16C illustrate a matching method performed with a chromatic aberration level occurring.

As shown in FIGS. 16A through 16C, the matching process is performed after coordinates are shifted in accordance with the effect of the chromatic aberration level in the chromatic aberration level correction process. As shown in FIG. 16A, the center pixel in a distribution 144 of a chromatic aberration map 143 is shifted to coordinates (1,−1) in accordance with the chromatic aberration of magnification. The map comparator 76 matches a white saturation pixel 142 in the white saturation map 140 against the pixel of interest in the chromatic aberration map 143, and shifts all pixels of the white saturation map in order to match the white saturation pixel 142 against the center pixel of the distribution 144 of the chromatic aberration map 143 (white saturation pixel 146).

The coordinates of the pixel of interest 141 are shifted from (−2,−2) to (−3,−2) (pixel of interest 147). The map comparator 76 performs the coordinates conversion, converts the coordinate values of the pixel of interest 147 to the absolute values thereof, and shifts the pixel of interest 147 to a position of a pixel of interest 148 at coordinates (3,1) to within the chromatic aberration map 143 as shown in FIG. 16C.

More specifically, the chromatic aberration level at the coordinates (3,1) of the pixel of interest 148 becomes a chromatic aberration level of the pixel of interest 148 arising form the white saturation pixel 146. The map comparator 76 performs the above-described process on each white saturation pixel in the white saturation map 140 and treats the integral value of the chromatic aberration levels as the chromatic aberration level of the pixel of interest.

By taking into consideration both the axial chromatic aberration and the chromatic aberration of magnification, the chromatic aberration level calculator 43 calculates a more accurate chromatic aberration level than when the chromatic aberration level is calculated based on only the axial chromatic aberration or when the chromatic aberration level is calculated based on only the chromatic aberration of magnification. Using both the white saturation map and the chromatic aberration map, the chromatic aberration level calculator 43 determines a single chromatic aberration level without separating the axial chromatic aberration and the chromatic aberration of magnification from each other, thereby calculating the chromatic aberration level more easily and more accurately. The subtractor 92 thus performs the chromatic aberration correction more easily and more accurately.

Returning to FIG. 12, the map comparator 76 calculates the chromatic aberration level, and completes the chromatic aberration level calculation process by supplying the calculated chromatic aberration level to the corrected signal generator 46. Processing returns to step S24 of FIG. 9 to perform step S25 and subsequent steps.

Figure 17:
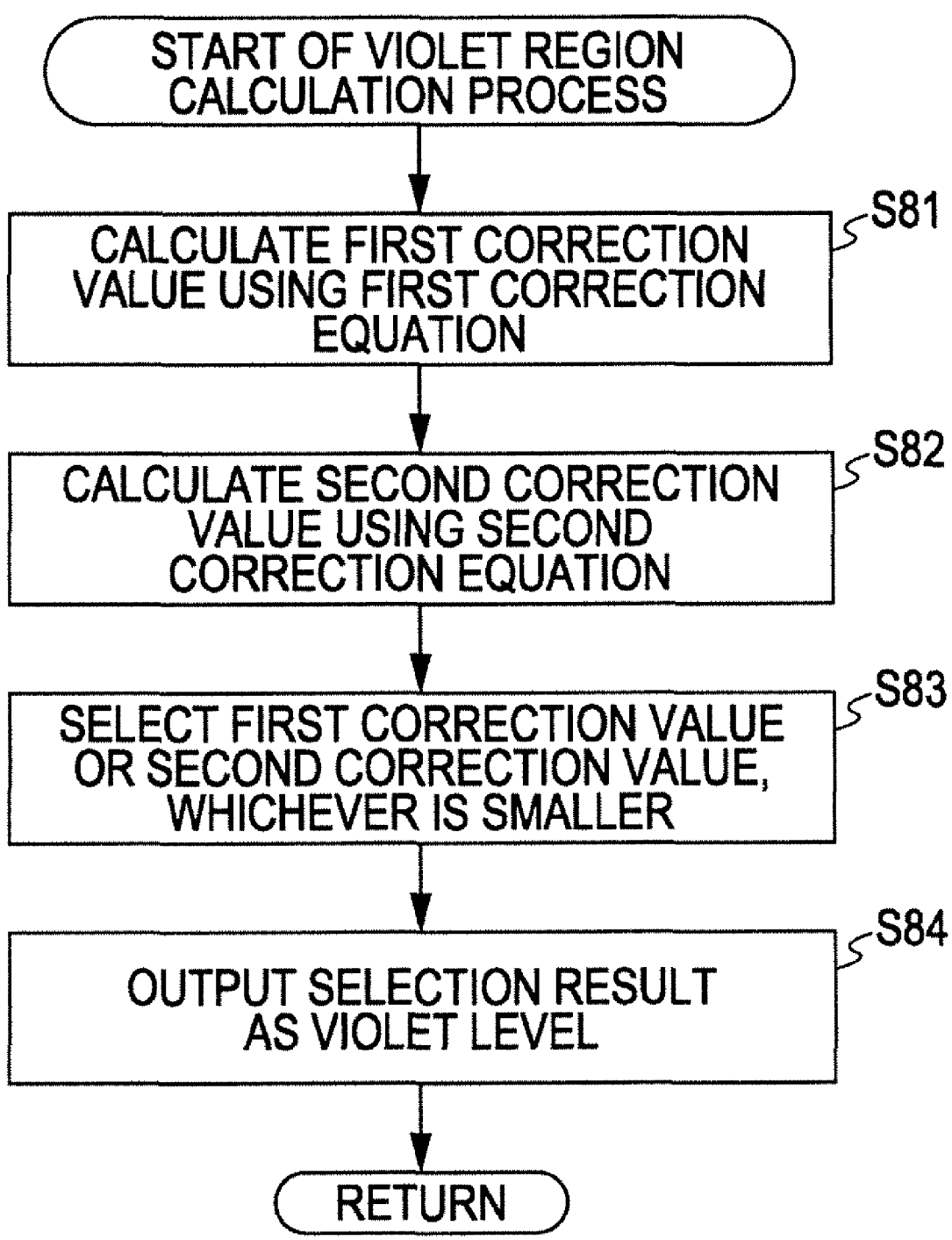
FIG. 17 is a flowchart illustrating in detail a violet region calculation process.
Figure 18:
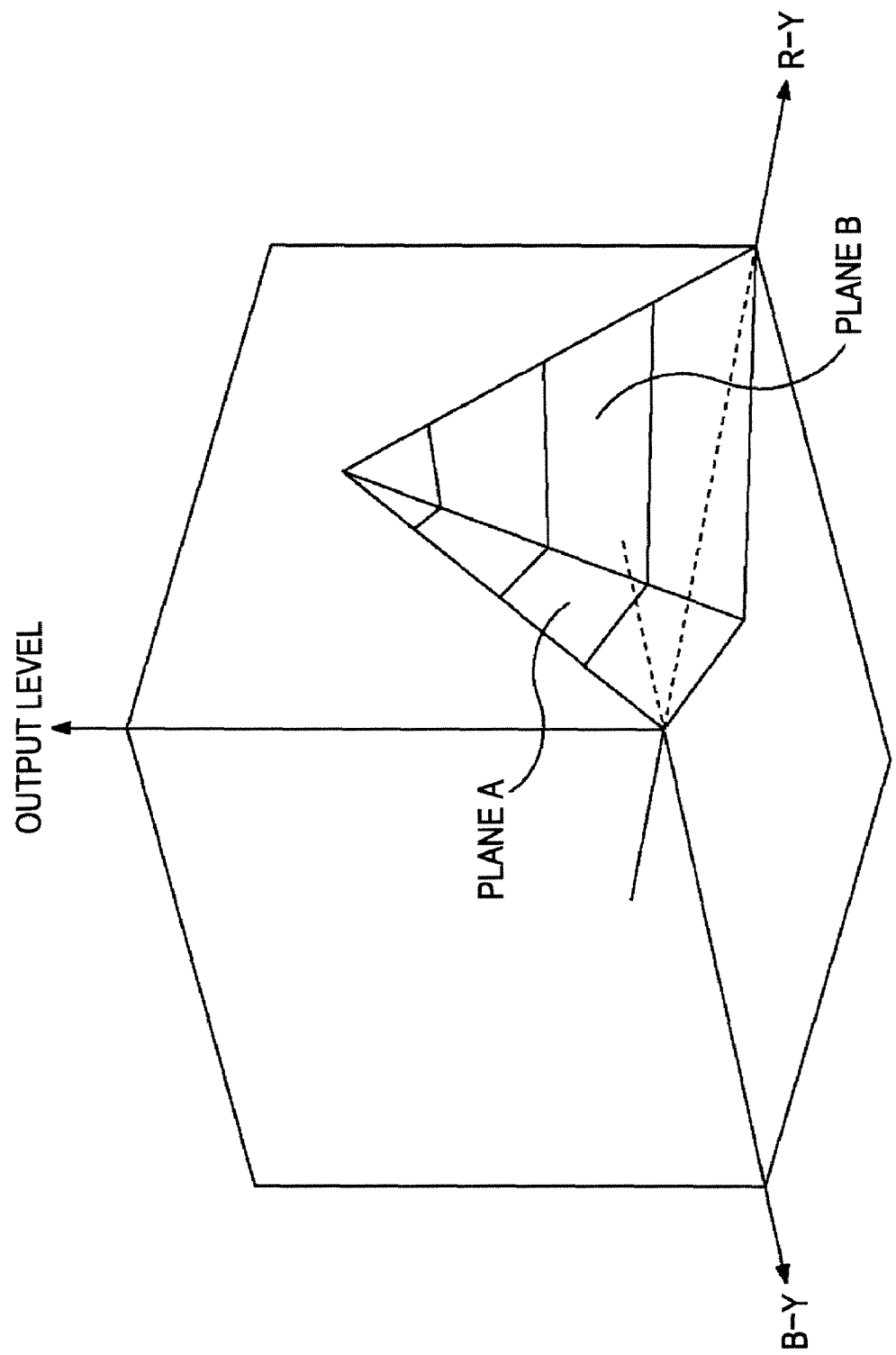
FIG. 18 illustrates a violet region that is being extracted.

The violet region calculation process performed in step S25 of FIG. 9 is described below with reference to the flowchart of FIG. 17. FIG. 18 is also referenced as necessary.

When the violet region calculation process starts, the first correction value calculator 81 in the violet region calculator 45 calculates the first correction value using the first correction equation (4) in step S81:

First correction value=$(Cr+\text{offset1})*\text{gain\_ry1}+(Cb+\text{offset2})*\text{gain\_by1}$ (4)

wherein offset1, offset2, gain_ry1 and gain_by1 are predetermined constants, and Cr is a Cr signal value and Cb is a Cb signal value.

In step S82, the second correction value calculator 82 in the violet region calculator 45 calculates the second correction value using the second correction equation (5) in step S82:

Second correction value=$(Cr+\text{offset1})*\text{gain\_ry2}+(Cb+\text{offset2})*\text{gain\_by2}$ (5)

where offset1, offset2, gain_ry2 and gain_by2 are predetermined constants, and Cr is a Cr signal value and Cb is a Cb signal value.

When the first correction value and the second correction value are calculated, the correction value selector 83 selects the first correction value or the second correction value, whichever is smaller, in step S83 and outputs the selected correction value as the violet level in step S84.

FIG. 18 illustrates a space defined by an x axis plotting Cb(B−Y), a y axis plotting Cr(R−Y), and a z axis plotting an output level (each of x, y, and z being positive). A plane A is represented by the first correction equation and a plane B is represented by the second correction equation. The violet region calculator 45 then calculates the correction value that provides a larger output to a color to be chromatic aberration corrected (violet) indicated by the plane A or the plane B, whichever is smaller.

Parameters offset1, offset2, gain_ry1, gain_by1, gain_ry2, and gain_by2 determine the position and inclination of the plane A and the plane B, and the values of the parameters are determined depending on which color region output level to enhance. As shown in FIG. 18, for example, the values of the parameters are determined as follows:

offest1=offset2=0 gain_ry1=gain_by1=gain_ry2=2.0 gain_by2=−20

When the violet level is output, the correction value selector 83 completes the violet region calculation process. Processing returns to step S25 of FIG. 9 to perform step S26 and subsequent steps.

Figure 19:
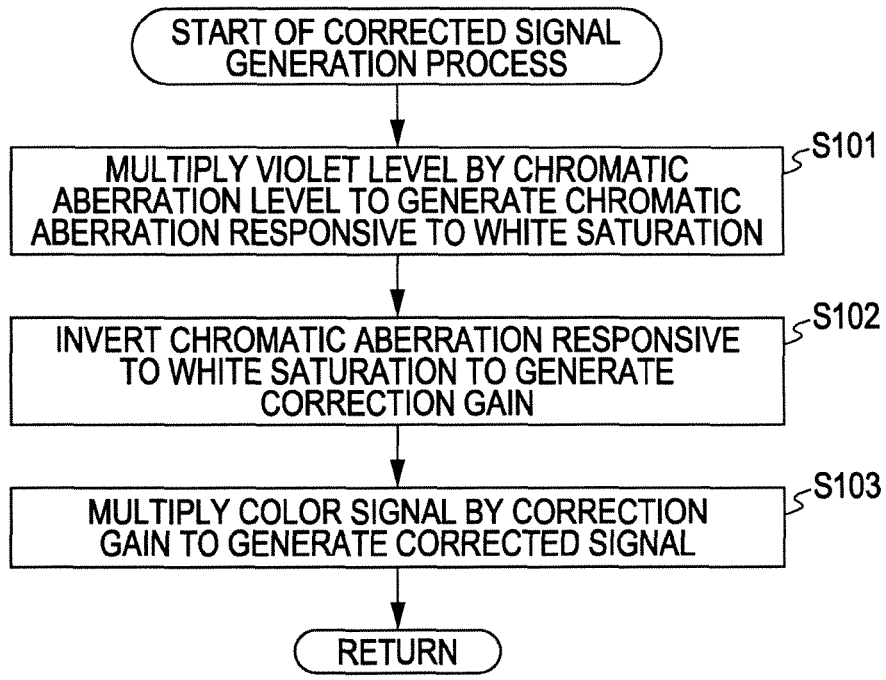
FIG. 19 is a flowchart illustrating in detail a corrected signal generation process.

The uncorrected signal generation process performed in step S26 of FIG. 9 is described in detail below with reference to the flowchart of FIG. 19.

When the corrected signal generation process starts, the multiplier 91 multiplies the violet level (P) by the chromatic aberration (A) in step S101, thereby generating the chromatic aberration level responsive to the white saturation (P*A ($0 \leq P*A \leq 1$)). By multiplying the violet level by the chromatic aberration level responsive to the white saturation, the multiplier 91 performs the correction process so that the chromatic aberration level in a violet region becomes large (a portion other than the violet region becomes small).

In step S102, the subtractor 92 subtracts the chromatic aberration level responsive to the white saturation (P*A) calculated in step S101 from the value "1", thereby inverting the chromatic aberration level responsive to the white saturation (P*A) and generating the correction gain ($1-P*A(0 \leq 1-P*A \leq 1)$).

In step S103, the multiplier 93 multiplies the signals (Cr and Cb) by the correction gain (1−P*A), thereby generating the corrected signals (Cr(1−P*A) and Cb(1−P*A)). More specifically, the corrected signal generator 46 generates and outputs a corrected signal in which an achromatizing process is performed more stronger on a pixel closer to a white saturation pixel and having a color closer to a color to be corrected (for example, violet).

The corrected signal generator 46 performs the correction taking into consideration the violet level. The corrected signal generator 46 can thus generate the more accurately chromatic aberration corrected signal than a method of simply performing a chromatic aberration correction on pixels adjacent to a white saturation pixel or a method of performing chromatic aberration correction based on simply the violet level. The chromatic aberration corrector 29 can thus perform the chromatic aberration correction more accurately.

Upon generating the corrected signal, the multiplier 93 completes the corrected signal generation process. Processing returns to step S26 of FIG. 9 to perform step S27 and subsequent steps.

Figure 20:
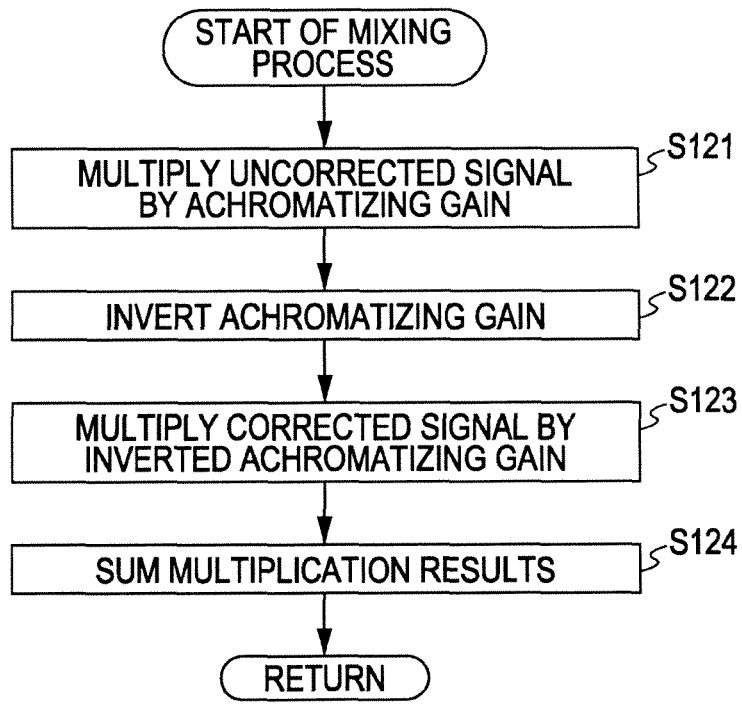
FIG. 20 is a flowchart illustrating in detail a corrected signal mixing process.

The signal mixing process performed in step S29 of FIG. 9 is described in detail below with reference to the flowchart of FIG. 20.

When the mixing process starts, the multiplier 101 multiplies the uncorrected signal by the achromatizing gain (chromatic aberration level responsive to the white saturation) in step S121. In step S122, the subtractor 102 subtracts the achromatizing gain from the value "1", thereby inverting the achromatizing gain.

In step S123, the multiplier 103 multiplies the corrected signal by the inverted achromatizing gain. In step S124, the adder 104 adds the resulting product calculated in step S123 to the resulting product calculated in step S121, thereby outputting the post-correction signal (mixture signal).

More specifically, the mixer 49 mixes the uncorrected signal and the corrected signal in accordance with the ratio responsive to the achromatizing gain ($P(0 \leq P \leq 1)$) by calculating the following equation (6):

Mixture signal=(Uncorrected signal×$P$)+(corrected signal×(1−$P$)) (6)

The mixer 49 mixes the uncorrected signal and the corrected signal using the achromatizing gain so that the chromatic aberration corrected pixel outputs corrected data and so that the chromatic aberration uncorrected pixel outputs original data. By mixing the uncorrected video data, the mixer 49 controls degradation in a pixel in an uncorrected portion, thereby resulting in a more natural chromatic aberration correction. The chromatic aberration corrector 29 controls image quality degradation and unnatural correction, thereby performing a more appropriate chromatic aberration correction.

Upon completing step S124, the adder 104 completes the mixing process. Processing returns to step S29 of FIG. 9 to end the chromatic aberration correction process.

The chromatic aberration corrector 29 performs the chromatic aberration correction more easily, and the image processor 14 can perform the chromatic aberration correction on the input video signal more easily and more accurately. The image pickup apparatus 1 can thus provide pickup image data that has undergone the chromatic aberration correction more easily and more accurately.

In the above discussion, the white saturation determiner 41 in the chromatic aberration corrector 29 performs the white saturation determination process using the luminance signal. As represented by equation (1), the white saturation determiner 41 may perform the white saturation determination process using the G signal because the luminance signal (Y signal) has a high correlation with the green signal (G signal) of the RGB signals.

Figure 21A:
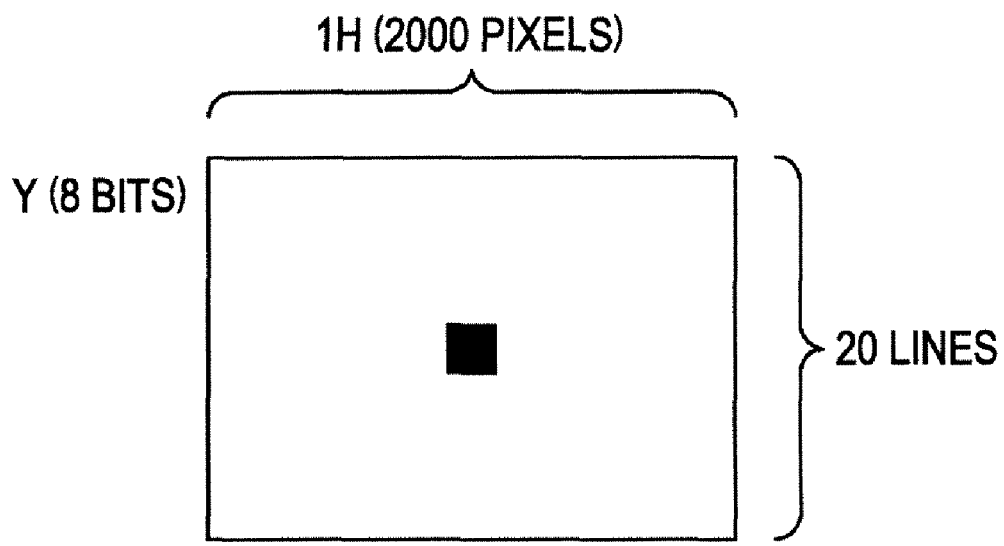
FIGS. 21A and 21B illustrate a low-pass filter.

When the white saturation determination process is performed using the luminance signal, a delay is caused because of the white saturation map generation. The line memory 27 needs to store the luminance signal. For example, if the white saturation map is produced within a range of 20 lines in a vertical direction of an image, the line memory 27 needs to store the luminance signal of the 20 lines as shown in FIG. 21A. If one line is composed of 2000 pixels, and the luminance value is data of 8 bits, a memory size of 320000 bits=8 (bits)×20 (lines)×2000 (pixels) is required.

Figure 21B:
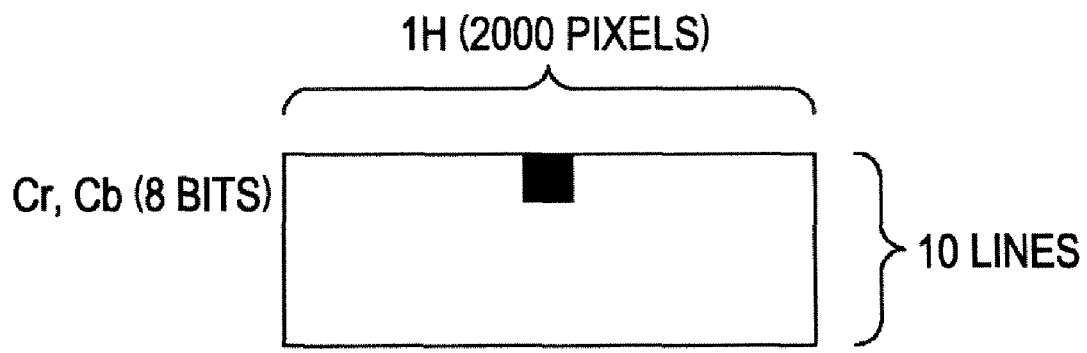

During the delay, the line memory 44 needs to store the color signal. As shown in FIG. 21B, the line memory 44 stores data of 10 lines. If one line is composed of 2000 pixels and the color value is 8 bits, a memory size of 160000 bits=8 (bits)×10 (lines)×2000 (pixels) is required.

The image processor 14 of FIG. 1 needs a memory size of 480000 bits=320000 bits+160000 bits.

The image pickup apparatus 1 of FIG. 1 performs the white saturation determination process using the luminance signal. After the white saturation determiner 41 in the chromatic aberration corrector 29 of the image processor 14 performs a variety of processes on the video signal with the optical and image pickup element corrector 21 through the γ corrector 25, the white saturation determination process cannot be performed until the Y signal processing unit 26 generates the luminance signal.

From among the various processes performed by the optical and image pickup element corrector 21 through the γ corrector 25, a spatial process is performed across a plurality of lines in a vertical direction of an image in the noise reduction process of the noise reducer 22 and the mosaic process of the mosaic processing unit 23. For this reason, the noise reducer 22 and the mosaic processing unit 23 also have the line memories thereof. The line memories store the video signal of a plurality of lines. The output is thus accordingly delayed.

An example of the spatial process is the one performed by a low-pass filter of FIG. 22. FIG. 22 is a block diagram illustrating a configuration of a low-pass filter having 5 taps in the image vertical direction.

The low-pass filter of FIG. 22 includes an adder 201, an SRAM 202, a multiplier 203, an SRAM 204, a multiplier 205, an SRAM 206, a multiplier 207, an SRAM 208, and a divider 209.

The SRAM 202, the SRAM 204, the SRAM 206 and the SRAM 208 are line memories, each storing the video signal of one line. These SRAMs are cascaded. When a new line of video signal is supplied to the SRAM 202, the video signal stored in each SRAM is successively transferred. The output of the SRAM 202 is quadrupled by the multiplier 203 and then supplied to the adder 201. The output of the SRAM 204 is sextupled by the multiplier 205 and then supplied to the adder 201. The output of the SRAM 206 is quadrupled by the multiplier 207 and then supplied to the adder 201. The input to the SRAM 202 and the output from the SRAM 208 are directly input to the adder 201.

The adder 201 sums all inputs and supplies the sum to the divider 209. The divider 209 outputs one sixteenth of the sum.

The low-pass filter is a vertical direction low-pass filter of (1,4,6,4,1). Four stages of the line memories (SRAMs) each storing one line of video signal are vertically cascaded. As shown in FIG. 21, a lower SRAM stores older data (on an upper side of the screen), and an upper SRAM stores newer data (on a lower side of the screen). An output phase of the video data is stored in the center of the low-pass filter, namely, on the SRAM 204, and delayed by two lines with respect to a current signal that is output after being sextupled by the multiplier 205.

If the image processing is performed using a plurality of pixels in the vertical direction, the above-described SRAM structure is required. As a result, a delay of a plurality of lines occurs.

The white saturation determination process may be performed using the green signal (G signal). The delay due to the line memory (SRAM) may be used to save memory required to perform the chromatic aberration correction.

FIG. 23 is a block diagram of another image pickup apparatus 251 in accordance with one embodiment of the present invention.

As shown in FIG. 23, the image pickup apparatus 251 includes an image processor 264 instead of the image processor 14 in the image pickup apparatus 1 of FIG. 1.

As the image processor 14, the image processor 264 includes the optical and image pickup element corrector 21, the noise reducer 22, the mosaic processing unit 23, the white balancer 24, the γ corrector 25, the Y signal processing unit 26, the C signal processing unit 28, a white saturation determiner 271, a white saturation information storage unit 272, and a chromatic aberration corrector 273.

The white saturation determiner 271 is substantially identical in structure and operation to the white saturation determiner 41 of FIG. 3. The white saturation determiner 41 performs the white saturation determination process using the luminance signal while the white saturation determiner 271 performs the white saturation determination process using the green (G) signal output from the A/D converter 13. The white saturation determiners 41 and 271 are identical in the determination method. The white saturation determiner 271 supplies the white saturation determination result (for example, information of 1 bit) obtained from the green signal to the white saturation information storage unit 272.

As the white saturation information storage unit 42 of FIG. 2, the white saturation information storage unit 272 temporarily stores the determination result supplied from the white saturation determiner 271 as the white saturation information. The white saturation information storage unit 272 generates a white saturation map of the pixel of interest in the chromatic aberration corrector 273 from the white saturation information accumulated during the noise reduction process and the mosaic process, and then supplies the white saturation map to the chromatic aberration corrector 273 at a predetermined timing.

The chromatic aberration corrector 273 performs the chromatic aberration correction on the color signal using the white saturation map.

Figure 24:
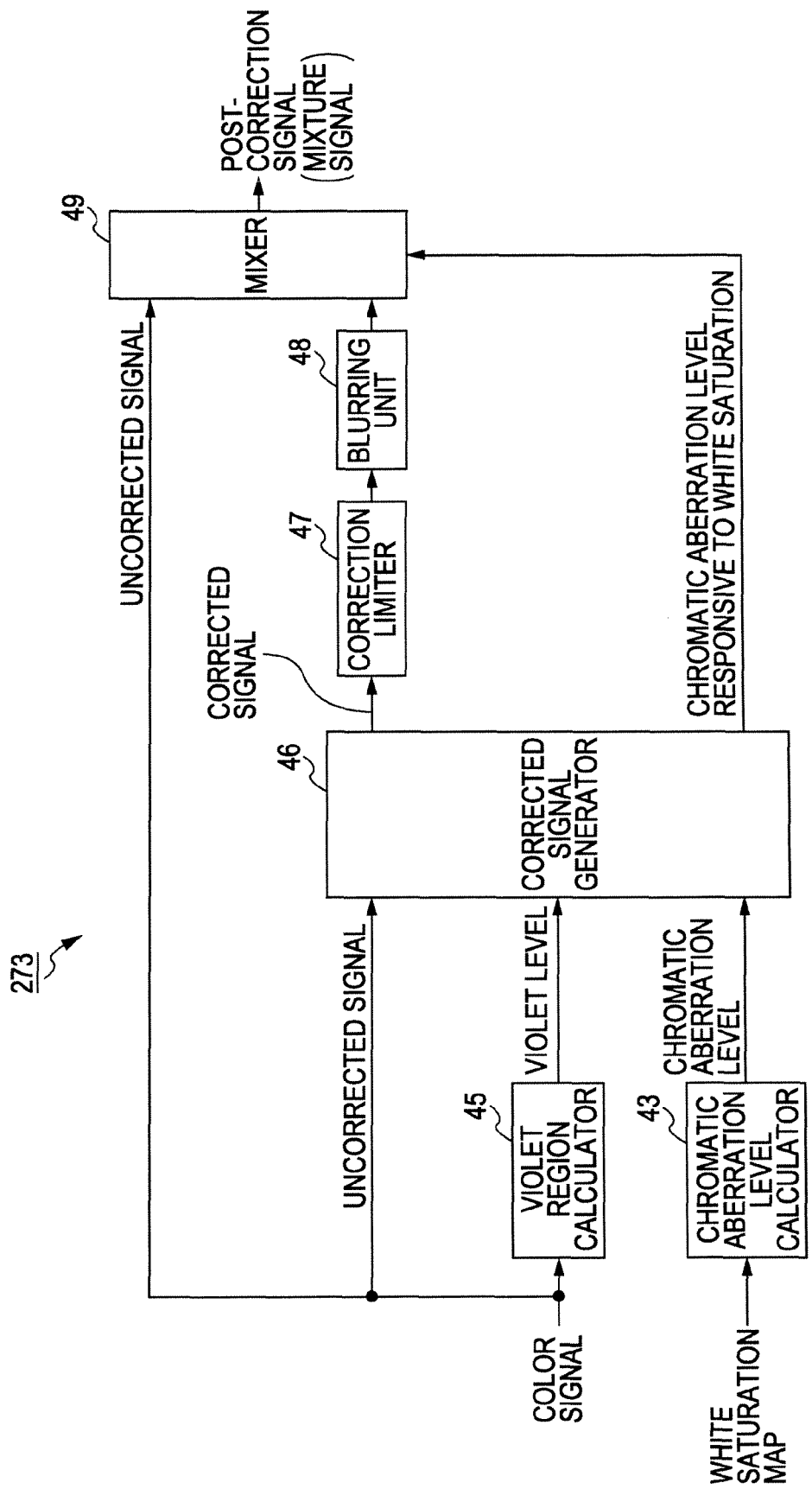
FIG. 24 is a block diagram of a chromatic aberration corrector of FIG. 23.

FIG. 24 is a block diagram illustrating in detail the chromatic aberration corrector 273 of FIG. 23. As shown in FIG. 24, the chromatic aberration corrector 273 includes the chromatic aberration level calculator 43, the violet region calculator 45, the corrected signal generator 46, the correction limiter 47, the blurring unit 48, and the mixer 49.

In other words, the chromatic aberration corrector 273 is identical to the subtractor 92 of FIG. 2 but without the white saturation determiner 41, the white saturation information storage unit 42, and the line memory 44. The discussion of the elements of the chromatic aberration corrector 273 is thus omitted herein.

The flow of the image processing of the image processor 264 of FIG. 23 is described below with reference to a flowchart of FIG. 25. The image processing of FIG. 25 corresponds to the image processing of FIG. 8 performed by the image processor 14 of FIG. 1.

When the image processing starts, the white saturation determiner 271 in the image processor 264 performs the white saturation determination process using the green signal (G signal) supplied from the A/D converter 13. The white saturation determination process is performed as described with reference to the flowchart of FIG. 11, and the discussion thereof is omitted herein. As shown in FIG. 25, the green signal (G signal) is substituted for the luminance signal.

When the white saturation determination process is complete in step S201, the white saturation information storage unit 272 stores the determination result in step S202.

Steps S203 through S209 are respectively identical to steps S1 through S8 of FIG. 8.

In step S210, the white saturation information storage unit 272 generates the white saturation map of the pixel of interest in the chromatic aberration corrector 273 from the stored determination result thereof, and then supplies the generated white saturation map to the chromatic aberration corrector 273. The chromatic aberration corrector 273 performs the chromatic aberration correction process in step S211, and outputs the luminance signal and the color signal in step S212, and then ends the image processing.

Figure 26:
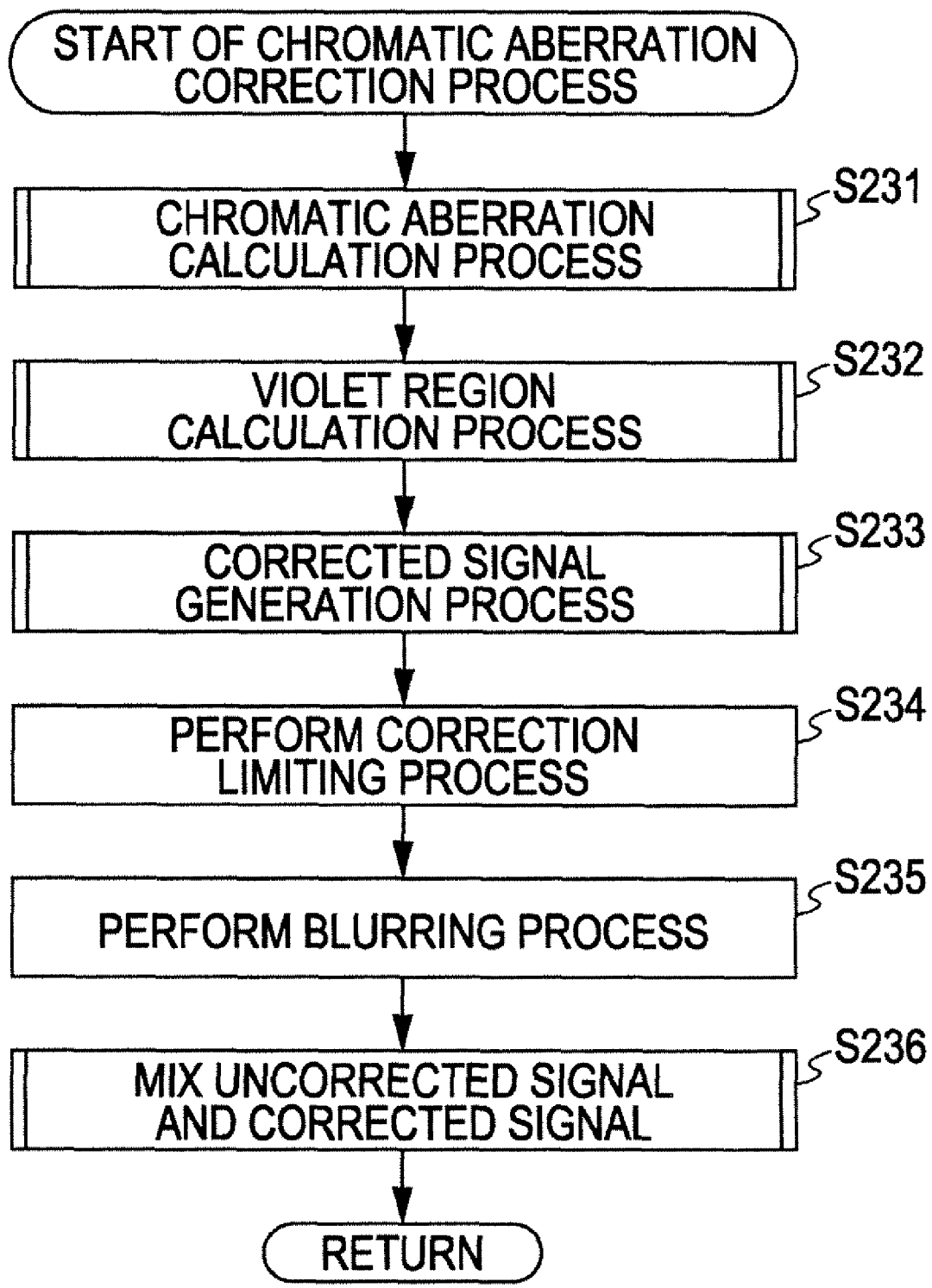
FIG. 26 is a flowchart illustrating in detail a chromatic aberration correction process.

The chromatic aberration correction process performed in step S211 of FIG. 25 is described below with reference to a flowchart of FIG. 26. The chromatic aberration correction process of FIG. 25 is identical to the chromatic aberration correction process of FIG. 9 performed by the chromatic aberration corrector 29 of FIG. 2.

When the chromatic aberration correction process starts, the elements of the chromatic aberration corrector 273 perform steps S231 through S236 to output the mixture signal as in steps S24 through S29 of FIG. 9. The chromatic aberration corrector 273 performs the chromatic aberration correction process as the chromatic aberration corrector 29 of FIG. 2 except that the white saturation map has been already generated. When the mixture signal is output, the mixer 49 completes the chromatic aberration correction process. Processing returns to step S211 of FIG. 25 to perform step S212 and subsequent steps.

The white saturation pixel determination process is performed using the output from the A/D converter 13. The white saturation information is stored as information of 1 bit on the chromatic aberration corrector 273. Taking advantage of a time difference (delay) for the vide data to travel from the A/D converter 13 to the chromatic aberration corrector 273, the white saturation information is accumulated. More specifically, time to accumulate the white saturation information used to produce the white saturation map is saved taking advantage of the line memory of each element in the image processor. The capacity of the memory for the chromatic aberration correction process is substantially reduced. The time difference is determined by the size of circuit arrangement for performing the spatial process in the vertical direction such as the noise reduction process and the mosaic process, namely, determined by the number of line memories.

Figure 27:
FIG. 27 illustrates a relationship in time series between the white saturation detection process and the chromatic aberration level correction process.
Figure 28:
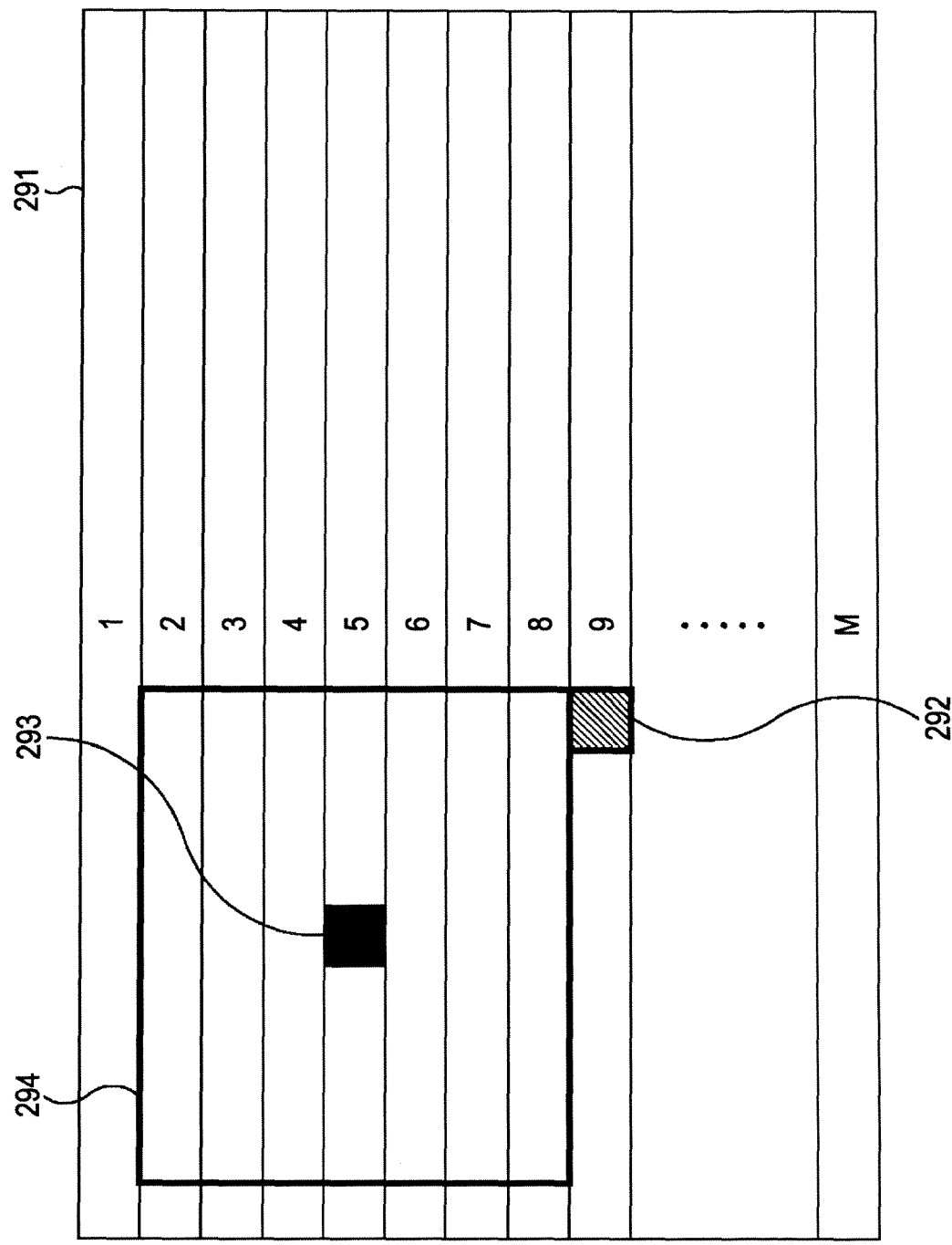
FIG. 28 illustrates a relationship on a screen between the white saturation detection process and the chromatic aberration correction process.

FIG. 27 illustrates a relationship between the white saturation detection process and the chromatic aberration correction process in the time series in the image processor 264 of FIG. 23. FIG. 28 illustrates a relationship between the white saturation detection process and the chromatic aberration correction process on the screen in the image processor 264 of FIG. 23.

The video signal supplied from the A/D converter 13 includes a vertical synchronization signal (V) shown in FIG. 27A and a horizontal synchronization signal (H) shown in FIG. 27B, and is read from the CCD 12 line by line as shown by an image reading line of FIG. 27C. When a ninth line of the video signal is input to the image processor 264, the white saturation determiner 271 detects a white saturation pixel at the ninth line as shown in FIG. 27D for example, and the chromatic aberration corrector 273 performs the chromatic aberration correction process on a fifth line for example. The correction range (area of the white saturation map) is from a second line to an eighth line as shown in FIG. 27E.

As shown in FIG. 28, the white saturation detection process is performed on a pixel of interest 292 for white saturation detection at the ninth line. As a white saturation map of the chromatic aberration correction pixel of interest 293 at the fifth line, the determination result within the correction range 294 from the second line to the eighth line defined by a heavy-lined box is output to the chromatic aberration corrector 273. The chromatic aberration corrector 273 performs the chromatic aberration correction process on the chromatic aberration correction pixel of interest 293 at the fifth line using the white saturation map.

The generation of the white saturation map could cause a delay of four lines to take place. Since a delay caused by the other process is used as previously discussed, no delay is caused by the generation of the white saturation map.

Figure 29:
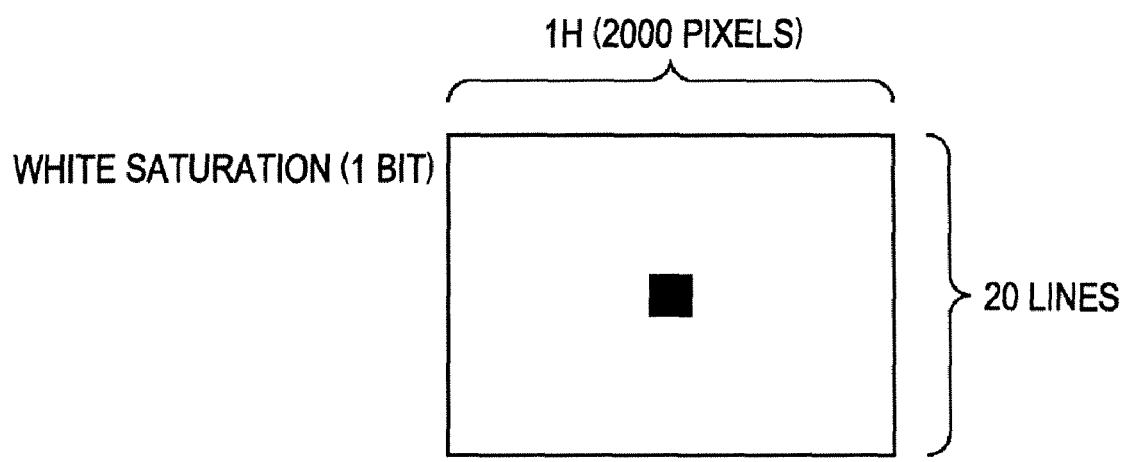
FIG. 29 illustrates a size of a memory used for the image processor of FIG. 23.

Since no delay is caused in the chromatic aberration corrector 273 in the image processor 264 of FIG. 23, the line memory 27 and the line memory 44 (FIG. 2) in the image processor 14 of FIG. 1 are eliminated. The memory size of the white saturation information storage unit 272 may be 1 (bit)× 20 (lines)×2000 (pixels)=4000 bits or so as shown in FIG. 29. Since the image processor 264 does not require the memory area of FIG. 21, the memory size used to perform the chromatic aberration correction process is substantially reduced. The arrangement leads to a reduction in the size of circuit arrangement and a cost reduction in manufacturing. Power consumption and operating costs are also reduced. With the component count of the apparatus reduced, durability and reliability are increased. The image processor 264 can perform the chromatic aberration correction more easily and more accurately.

The image pickup apparatus has been discussed. The present invention is applicable to any apparatus as long as the apparatus processes images.

In the above discussion, the white saturation map and the chromatic aberration map are produced and compared. The size and shape of these maps are not limited to any particular ones. The white saturation map and the chromatic aberration map may be different from each other in size and shape. Information other than the map information of data of each pixel may be used as long as the information is equivalent to the white saturation map and the chromatic aberration map and permits itself to be compared in the chromatic aberration correction process. For example, table information containing required information only may be used. Alternatively, functions accounting for coordinates and values may be used. Each of the image processor 14 and the image processor 264 may perform the achromatizing process using the result that is obtained by multiplying a function depending on the white saturation (white saturation distribution information representing the distribution of the white saturation pixels) by the output of the function (chromatic aberration level distribution information representing the distribution of the chromatic aberration level as a correction value to the chromatic aberration level of the adjacent pixel by the white saturation of the pixel of interest).

The above-described series of process steps may be executed using software or hardware. If the series of process steps is performed using software, each of the above-described apparatus may be embodied using a personal computer 3000 of FIG. 30.

As shown in FIG. 30, a central processing unit (CPU) 301 of the personal computer 3000 performs a variety of processes in accordance with a program stored on a read-only memory (ROM) 302 or a program loaded from a storage unit 313 to a random-access memory (RAM) 303. As necessary, the RAM 303 stores data required for the CPU 301 to perform the variety of processes.

The CPU 301, the ROM 302, and the RAM 303 are interconnected to each other via a bus 304. The bus 304 also connects to an input-output interface 310.

The input-output interface 301 also connects to an input unit 311, composed of a keyboard and a mouse, an output unit 312, composed of a display including one of a cathode ray tube (CRT) and a liquid-crystal display (LCD), and a loud-speaker, the storage unit 313 composed of a hard disk, and a communication unit 314 composed of a modem. The communication unit 314 performs a communication process via networks including the Internet.

The input-output interface 310 also connects to a drive 315 as necessary. The drive 315 is loaded with a removable medium 321 such as a magnetic disk, an optical disk, a magneto-optical disk, or a semiconductor memory. A computer program read from the removable medium is installed onto the storage unit 313.

If the series of process steps is performed using software, a program constructing the software may be installed from a storage medium or via a network.

As shown in FIG. 30, the recording media may include a removable medium 321 distributed to provide the user with the program separate from the computer. The removable media include a magnetic disk such as a flexible disk, an optical disk such as compact disk read-only memory (CR-ROM) or digital versatile disk (DVD), a magneto-optical disk such as Mini-Disk (MD®), and a semiconductor memory. The recording media may include the ROM 302 and a hard disk contained in the storage unit 313, each supplied in the apparatus to the user and storing the program.

The process steps describing the program stored on the recording medium may be performed in the order sequence as described above. The process steps may not necessarily be performed in the described order sequence, but may be performed in parallel or individually.

The system in the context of the specification refers to an entire system including a plurality of apparatuses.

The arrangement previously described as a single apparatus may be divided among a plurality of apparatuses. The arrangement previously described as a plurality of apparatuses may be integrated into a single apparatus. Optionally, an additional element which has not been described in the above discussion may be added to the apparatus. A portion of an apparatus may be included in another apparatus as long as the system remains unchanged in configuration and function.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for correcting chromatic aberration of video data, comprising:
   white saturation pixel detecting means for detecting a white saturation pixel having white saturation using only a G signal of the video data composed of an RGB signal;
   spatial signal processing means for performing a spatial signal process on the RGB signal across a plurality of lines;
   color signal generating means for generating a color signal from the RGB signal processed by the spatial signal processing means;
   white saturation distribution information generating means for generating white saturation distribution information representing a distribution of the white saturation pixels detected by the white saturation pixel detecting means; and
   chromatic aberration correcting means for correcting a chromatic aberration of the color signal generated by the color signal generating means, using the white saturation distribution information generated by the white saturation distribution information generating means.

2. The image processing apparatus according to claim 1, wherein the white saturation pixel detecting means comprises:
   white saturation pixel threshold value determining means for determining according to a predetermined pixel threshold value whether a pixel of interest is a white saturation pixel; and
   white saturation pixel determining means for determining whether another white saturation pixel is present adjacent to the pixel of interest that is determined as a white saturation pixel by the white saturation pixel threshold value determining means,
   wherein the pixel of interest is determined as a white saturation pixel only when the white saturation pixel determining means determines that another white saturation pixel is present adjacent to the pixel of interest.

3. The image processing apparatus according to claim 1, wherein the white saturation distribution information indicates the distribution of the white saturation pixels within a predetermined range surrounding a pixel of interest, and
   wherein the white saturation distribution information generating means generates the white saturation distribution information for each of the pixels of the video data.

4. The image processing apparatus according to claim 3, wherein the chromatic aberration correcting means comprises:
   chromatic aberration level calculating means for calculating a chromatic aberration level of each pixel, based on the white saturation distribution information of each pixel, generated by the white saturation distribution information generating means, and chromatic aberration level distribution information indicating a distribution of chromatic aberration level as a correction amount to chromatic aberration of a surrounding pixel due to the white saturation of the pixel of interest; and
   corrected signal generating means for generating a corrected signal having the chromatic aberration of each pixel of the video data, the chromatic aberration corrected using the chromatic aberration level calculated by the chromatic aberration level calculating means.

5. The image processing apparatus according to claim 4, wherein the chromatic aberration level calculating means comprises comparing means for comparing the chromatic aberration level distribution information with the white saturation distribution information in each pixel of the video data,
   wherein the chromatic aberration level of each pixel is calculated based on a comparison result of the comparing means.

6. The image processing apparatus according to claim 5, wherein the comparing means calculates the chromatic aberration level of each pixel by determining and then integrating the chromatic aberration level of the pixel of interest caused by each white saturation pixel contained in the white saturation distribution information using the chromatic aberration level distribution information of each pixel of the video data.

7. The image processing apparatus according to claim 4, wherein the chromatic aberration correcting means comprises chrominance level calculating means for calculating a chrominance level of each pixel based on the color signal of the video data,
   wherein the corrected signal generating means multiplies the chromatic aberration level, calculated by the chromatic aberration level calculating means, by the chrominance level calculated by the chrominance level calculating means, and corrects the chromatic aberration of the video data using a multiplication result to generate the corrected signal.

8. The image processing apparatus according to claim 7, wherein the chromatic aberration correcting means comprises mixing means for mixing the corrected signal generated by the corrected signal generating means and an uncorrected color signal of the video data in accordance with a ratio based on the multiplication result calculated by the corrected signal generating means.

9. An image processing method of an image processing apparatus for correcting chromatic aberration of video data, comprising steps of:
   detecting a white saturation pixel having white saturation using only a G signal of the video data composed of an RGB signal;
   performing a spatial signal process on the RGB signal across a plurality of lines;
   generating a color signal from the signal processed RGB signal;
   generating white saturation distribution information representing a distribution of the white saturation pixels; and
   correcting a chromatic aberration of the color signal, using the white saturation distribution information.

10. A non-transitory computer readable storage medium having stored thereon a program for causing a computer to execute a method for correcting chromatic aberration of video data, the method comprising steps of:
    detecting a white saturation pixel having white saturation using only a G signal of the video data composed of an RGB signal;
    performing a spatial signal process on the RGB signal across a plurality of lines;
    generating a color signal from the signal processed RGB signal;
    generating white saturation distribution information representing a distribution of the white saturation pixels; and
    correcting a chromatic aberration of the color signal, using the white saturation distribution information.

11. An information processing apparatus for correcting chromatic aberration of video data, comprising:
    a white saturation pixel detecting unit detecting a white saturation pixel having white saturation using only a G signal of the video data composed of an RGB signal;
    a spatial signal processing unit performing a spatial signal process on the RGB signal across a plurality of lines;

a color signal generating unit generating a color signal from the RGB signal processed by the spatial signal processing unit;

a white saturation distribution information generating unit generating white saturation distribution information representing a distribution of the white saturation pixels detected by the white saturation pixel detecting unit; and a chromatic aberration correcting unit correcting a chromatic aberration of the color signal generated by the color signal generating unit, using the white saturation distribution information generated by the white saturation distribution information generating unit.

* * * * *